United States Patent
Banirazi-Motlagh et al.

(10) Patent No.: US 10,519,718 B2
(45) Date of Patent: Dec. 31, 2019

(54) SYSTEMS AND METHODS TO CONTROL DIRECTIONAL DRILLING FOR HYDROCARBON WELLS

(71) Applicant: NATIONAL OILWELL VARCO, L.P., Houston, TX (US)

(72) Inventors: Reza Banirazi-Motlagh, Houston, TX (US); Mark Charles Penn, Katy, TX (US); Anthony Pink, Houston, TX (US); Joseph Kyle Smith, Cleveland, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 15/540,593

(22) PCT Filed: Dec. 29, 2015

(86) PCT No.: PCT/US2015/067865
§ 371 (c)(1),
(2) Date: Jun. 29, 2017

(87) PCT Pub. No.: WO2016/109538
PCT Pub. Date: Jul. 7, 2016

(65) Prior Publication Data
US 2017/0370151 A1    Dec. 28, 2017

Related U.S. Application Data

(63) Continuation-in-part of application No. 14/627,581, filed on Feb. 20, 2015, now Pat. No. 10,054,917.
(Continued)

(51) Int. Cl.
*E21B 7/04*     (2006.01)
*G05B 15/02*    (2006.01)
*E21B 44/00*    (2006.01)
*E21B 47/022*   (2012.01)

(52) U.S. Cl.
CPC ............... *E21B 7/04* (2013.01); *E21B 44/00* (2013.01); *E21B 47/022* (2013.01); *G05B 15/02* (2013.01)

(58) Field of Classification Search
CPC ...... E21B 44/00; E21B 41/0092; E21B 45/00; E21B 44/02; E21B 47/06; E21B 44/04;
(Continued)

(56) References Cited

U.S. PATENT DOCUMENTS

| 4,733,733 A | 3/1988 | Bradley et al. |
| 6,092,610 A | 7/2000 | Kosmala et al. |

(Continued)

FOREIGN PATENT DOCUMENTS

WO    2013082498    6/2013

OTHER PUBLICATIONS

International Search Report and Written Opinion for International Application No. PCT/US2015/067865 dated Mar. 18, 2016.
(Continued)

*Primary Examiner* — Robert E Fennema
*Assistant Examiner* — Shon G Foley
(74) *Attorney, Agent, or Firm* — Blank Rome LLP

(57) ABSTRACT

Embodiments of systems and methods to control directional drilling in borehole drilling for hydrocarbon wells are disclosed. An actual toolface orientation measurement value and an actual downhole torque on bit (DTOB) or actual downhole weight on bit (DWOB) measurement value for a drill string positioned in a borehole are determined. Responsive to a comparison of target measurement values and actual measurement values, error values are determined. A control command for one or more of a top drive, a drawworks, and a mud pump responsive to the DTOB or DWOB error value and the toolface orientation error value is determined. Additionally, one or more of the top drive, the
(Continued)

drawworks, and the mud pump are operated responsive to the control command thereby to correct a toolface orientation of the drill string.

12 Claims, 12 Drawing Sheets

Related U.S. Application Data

(60) Provisional application No. 62/097,644, filed on Dec. 30, 2014.

(58) Field of Classification Search
CPC .......... E21B 44/06; E21B 47/022; E21B 7/04; G05B 15/02; G05B 2219/45129; G05B 13/041
USPC ........................................................ 700/160
See application file for complete search history.

(56) References Cited

U.S. PATENT DOCUMENTS

| | | |
|---|---|---|
| 6,389,360 B1 | 5/2002 | Alft et al. |
| 7,823,655 B2 | 11/2010 | Boone et al. |
| 8,210,283 B1 | 7/2012 | Benson et al. |
| 2006/0212224 A1* | 9/2006 | Jogi .......................... G01V 1/40 702/9 |
| 2007/0257812 A1 | 11/2007 | Lasater |
| 2008/0135290 A1 | 6/2008 | Hopwood et al. |
| 2009/0000823 A1 | 1/2009 | Pirovolou |
| 2009/0090555 A1 | 4/2009 | Boone et al. |
| 2009/0205867 A1 | 8/2009 | Reckmann et al. |
| 2010/0300753 A1* | 12/2010 | Hopwood ................ E21B 44/00 175/24 |
| 2012/0005542 A1 | 1/2012 | Petersen et al. |
| 2012/0318578 A1 | 12/2012 | Schumacher et al. |
| 2013/0341091 A1 | 12/2013 | Sugiura |
| 2014/0231141 A1 | 8/2014 | Hay et al. |
| 2015/0012253 A1* | 1/2015 | O'Donnell .......... G06F 17/5009 703/2 |
| 2017/0308634 A1* | 10/2017 | Samuel ................... E21B 44/00 |

OTHER PUBLICATIONS

Jucker, C., Extended European Search Report, dated Apr. 19, 2018, European Patent Office.

\* cited by examiner

SYSTEMS AND METHODS TO CONTROL DIRECTIONAL DRILLING FOR HYDROCARBON WELLS

RELATED APPLICATIONS

This application is a U.S. National Phase under 35 U.S.C. § 371 of International Application No. PCT/US2015/067865, filed Dec. 29, 2015, titled "SYSTEMS AND METHODS TO CONTROL DIRECTIONAL DRILLING FOR HYDROCARBON WELLS" which is a continuation-in-part of U.S. patent application Ser. No. 14/627,581, filed Feb. 20, 2015, titled "DRILLING DIRECT CONTROL USER INTERFACE," which claims priority to U.S. Patent Provisional Application No. 62/097,644, filed Dec. 30, 2014, titled "DRILLING DIRECT CONTROL SYSTEM," all of which are incorporated by reference herein in their entirety.

FIELD OF INVENTION

Embodiments of the invention relate to hydrocarbon well drilling and, more specifically, to systems, computer-readable media, interfaces, and methods to control directional drilling.

BACKGROUND

In the field of oil and gas exploration and production, hydrocarbon wells may be drilled to recover hydrocarbons from subterranean formations. Such wells may be constructed by drilling a borehole into a formation using a rotary drill bit attached to a remote end of a drill string. A fluid that may be referred to as "drilling mud" may be circulated down through the drill string to lubricate the drill bit and carry drill cuttings out of the wellbore as the fluid returns to the surface at the well site. The particular methods and equipment used to construct a particular well may vary extensively based on the environment and formation in which the well is being drilled. Many different types of equipment and systems may be used in the construction of wells, including, but not limited to, a rotating system for turning the drill bit, a hoisting system for lifting the drill string, a circulating system for managing the drilling fluid, pressure management equipment for controlling wellbore pressure, a directional drilling and steering system for non-vertical drilling, and several downhole tools.

Some oil and gas wells may not be drilled vertically straight but rather at a deviated angle from vertical and in a specified direction. Specific drilling methods may be deployed to deviate these wells to direct them in the desired well path. Such methods, known collectively as "directional drilling," may require drilling personnel to orient downhole equipment to drill the well in the desired well path. The overall directional drilling operation may be directed by a specific person known as the "directional driller."

"Sliding" may describe drilling with a mud motor rotating the bit downhole without rotating the drill string from the surface. This operation may be conducted when a bottom hole assembly has been fitted with a bent sub or a bent housing mud motor, or both, for directional drilling. Sliding may be a predominant method to build and control or correct hole angle in modern and conventional directional drilling operations.

A precise drill bit direction may be essential to drilling a borehole successfully, particularly in controlled steering and directional drilling. Achieving a precise drill bit direction may be obtained either by steering while sliding, which orients the bent segment of a downhole mud motor from the surface, or by steering while rotating, which utilizes a downhole rotary steerable system (RSS).

A drill bit direction may be determined by a toolface orientation in three-dimensional space. Downhole toolface orientation is a complex function of several drilling variables including, but not limited to, weight on bit (WOB), torque on bit (TOB), drill bit torsional speed (rotations per minute or RPM), mud motor differential pressure, rate of penetration (ROP), drill bit type, formation lithology, and the angular position of a rotating system. The overall efficiency of directional drilling, especially in the slide drilling, may depend on analyzing all of these variables and accordingly applying torque or angle corrections to the drill bit.

Current directional drilling practices may require the directional driller to verbally translate desired downhole equipment orientation to the rig's "driller," a person who may control the machinery on a rig floor that is used to drill the well. The driller then may apply and maintain the required settings of drilling machinery located on the drilling rig floor. These directional drilling methods may result in human error that consequentially may increase rig non-productive time, lower drilling efficiency, and drive up overall directional drilling cost.

SUMMARY

Applicant has recognized problems associated with drill bit direction in directional drilling and advantageously provides solutions to these problems in fields such as drilling control and automation systems. Applicant has recognized that, in the presence of latency or a delay in receiving toolface orientation information, a controlled steering process can lead to undesirable back-and-forth wandering of the drill bit, which can result in high trajectory tortuosity. Further, Applicant has recognized that substantially online transmission of downhole data while drilling can provide new and unique opportunities for automated drilling operations by eliminating or dramatically reducing the communication delay between downhole and the surface. Wired drill pipe technology, for example, can enable such data transmission. This online data transmission can enable real-time monitoring, optimization, and autonomous direct control solutions and systems for three-dimensional directional drilling. Applicant advantageously has recognized a need in the art for methods, systems, and apparatuses that can provide these capabilities.

Further, a measure of efficiency in a drilling operation can include how fast a borehole can be drilled, which is directly related to rate of penetration (ROP). An optimal ROP can be a function of several drilling variables including, but not limited to, weight on bit (WOB), torque on bit (TOB), drill bit torsional speed (rotations per minute or RPM), drilling fluid hydraulics, toolface orientation, drill bit type, and formation lithology. Increasing ROP can decrease the life of the drill bit, which in turn can increase drilling time because shorter drill bit life can necessitate more frequent replacements of the drill bit. An inappropriate ROP also can lead to such issues as vibration and sticking that can eventually slow down the drilling process. Applicant therefore has recognized that an autonomous directional drilling solution can optimize ROP while steering.

Applicant advantageously provides systems, methods, computer-readable media, interfaces, and apparatuses for drilling control and automation systems. More specifically, embodiments of systems, methods, computer-readable media, interfaces, and apparatuses for autonomous, closed-loop directional drilling that can interface with a plurality of drilling sensors and communication systems to support a variety of autonomous real-time direct control functions using a common operation infrastructure are provided. The common operation infrastructure can be configured to acquire data from a variety of sources and sensors, communicate that data with a variety of control functions and information interfaces, and provide substantially online operating instructions to drilling equipment and systems, all in real time and at a high data rate, which can be enabled by wired drill pipe and a surface data network, for example. Embodiments thus can enable an operator (or another application) to determine slide drilling with a preselected target downhole TOB (DTOB) and/or downhole WOB (DWOB) and under a specific toolface orientation.

Directional drilling conceptually can include orienting the bit in the desired direction and executing a series of slide drill and rotate drill iterations. Orienting can be accomplished by rotating and holding the axial position of the drill string so that the bent sub or bent housing, which has a small angle offset, orients the new direction in which to drill. Without turning the drill string, the bit can be rotated with a mud motor and drill in the direction it points. With steerable motors, when the desired wellbore direction is attained, the entire drill string can be rotated and drill straight rather than at an angle. By controlling the amount of hole drilled in the sliding versus the rotating mode, the wellbore trajectory can be controlled precisely.

Advantages of embodiments of the invention can include that a feedback control can obtain direct data at downhole. Because of this, the control can take into account unforeseen disturbances due to, for example, frictional, hydraulic, and lithology changes. By altering one or more surface drilling parameters immediately once deviations are observed in toolface orientation and downhole TOB, regardless of what caused the deviation, embodiments can deliver slide drilling with higher accuracy and stability.

For example, embodiments can include systems and methods to control directional drilling in borehole drilling for hydrocarbon wells. A system according to an embodiment can include, for example, a drill string positioned within a borehole for a hydrocarbon well. The borehole can extend from a surface into subterranean material. Further, a drill string can include one or more substantially cylindrical segments of drill pipe, a wire drilling line, a bottom hole assembly, a drill bit, and a downhole drive controller to control rotation of the drill bit. A system also can include a top drive positioned substantially at the surface and connected to the drill string. Operation of the top drive can rotate the drill string within the borehole. Additionally, a system can include a drawworks positioned substantially at the surface and connected to the drill string. The drawworks can include a substantially cylindrical spool around which the wire drilling line is wound, and the drawworks also can include a pulley and a brake to inhibit unwinding of the wire drilling line from the spool. Further, operation of the drawworks can rotate the spool thereby to extend the wire drilling line into the borehole and alternatively to retract the wire drilling line from the borehole. As a result, operation of the drawworks thereby can lower the drill string into the borehole and alternatively can reel the drill string in from the borehole. A system still further can include a mud pump positioned substantially at the surface and connected to the drill string. Operation of the mud pump can pump a drilling fluid through the one or more segments of drill pipe and the bottom hole assembly of the drill string to the drill bit. In addition, a system can include a first set of one or more sensors positioned along the drill string thereby defining one or more downhole sensors. A system also can include a second set of one or more sensors positioned at the surface thereby defining one or more surface sensors.

Additionally, a system according to an embodiment can include a controller. A controller can include one or more processors positioned at the surface and in communication with the downhole drive controller, the top drive, the drawworks, the mud pump, the one or more downhole sensors, and the one or more surface sensors. Further, the controller can be in communication with the downhole drive controller and the one or more downhole sensors through the one or more segments of drill pipe. A system also can include a non-transitory computer-readable medium in communication with the one or more processors of the controller. The non-transitory computer-readable medium can have one or more computer programs stored thereon that, when executed by the one or more processors, cause the system to perform certain actions. For example, a system can determine one or more of a target downhole torque on bit (DTOB) measurement value and a target downhole weight on bit (DWOB) measurement value responsive to receipt of user input from a user computing device in communication with the controller. A system also can determine a target toolface orientation measurement value responsive to receipt of the user input from the user computing device. In addition, a system can determine, responsive to one or more measurements at the one or more downhole sensors, an actual toolface orientation measurement value and one or more of an actual DTOB measurement value and an actual DWOB measurement value. A system further can determine, responsive to one or more measurements at the one or more surface sensors, a current top drive operation measurement value, a current drawworks operation measurement value, and a current mud pump operation value. Additionally, a system can determine one or more error values selected from a group of a DTOB error value and a DWOB error value. A DTOB error value can be determined responsive to a comparison of the target DTOB measurement value to the actual DTOB measurement value, and a DWOB error value can be determined responsive to a comparison of the target DWOB measurement value to the actual DWOB measurement value. Still further, a system can determine, responsive to a comparison of the target toolface orientation measurement value and the actual toolface orientation measurement value, a toolface orientation error value. A system also can determine a control command for one or more of the top drive, the drawworks, and the mud pump to correct each of the toolface orientation error value and the one or more of the DTOB error value and the DWOB error value responsive to the current top drive operation measurement value, the current drawworks operation measurement value, and the current mud pump operation value. In addition, a system can operate one or more of the top drive, the drawworks, and the mud pump responsive to the control command thereby to correct a toolface orientation of the drill string. Operation of the drawworks can include altering a weight on bit measurement value at the surface. Further, operation of the top drive can include altering one or more of an angle of the drill string with respect to the surface and a rotational speed of the drill string within the borehole. Operation of the mud pump can include altering a flow rate measurement value of the drilling fluid at the surface.

In some instances, determining the actual toolface measurement value and the one or more of the actual DTOB measurement value and the actual DWOB measurement value can include validating the one or more measurements at the one or more downhole sensors thereby to produce one or more validated measurements, as well as filtering the one or more validated measurements thereby to produce one or more filtered measurements. Further, determining the actual toolface measurement value and the one or more of the actual DTOB measurement value and the actual DWOB measurement value can include reconciling the one or more filtered measurements thereby to produce one or more reconciled measurements and verifying the one or more reconciled measurements thereby to produce one or more verified measurements. Determining the actual toolface measurement value and the one or more of the actual DTOB measurement value and the actual DWOB measurement value also can include remediating gross errors in the one or more verified measurements thereby to produce the actual toolface measurement value and the one or more of the actual DTOB measurement value and the actual DWOB measurement value. Additionally, in some circumstances, the control command can be responsive to one or more dynamic models of the drill string within the borehole. Further, operation of the drawworks can control a rate of penetration of the drill string. In addition, in some instances, the one or more computer programs, when executed by the one or more processors, can cause the system to estimate one or more future values of one or more downhole variables and to determine an optimal rate of penetration of the drill string responsive to a constrained optimization problem. The control command can be responsive to the determined optimal rate of penetration of the drill string.

Additionally, the control command can be for each of the top drive and the drawworks. In some circumstances, determining the control command can include using multi-input, multi-output control logic to determine the control command. Further, the multi-input, multi-output control logic can include a plurality of decision rules, and each of the decision rules can be associated with one or more of: drawworks control, top drive control, and mud pump control. In other circumstances, determining the control command can include using a first single-input, single-output control logic to determine the control command for the top drive and a second single-input, single-output control logic to determine the control command for the drawworks.

Another system according to an embodiment can include a controller, which can include one or more processors. Such a system also can include a non-transitory computer-readable medium in communication with the one or more processors of the controller. The non-transitory computer-readable medium can have one or more computer programs stored thereon that, when executed by the one or more processors, can cause the system to perform certain actions. For example, a system can determine an actual downhole torque on bit (DTOB) measurement value and an actual toolface orientation measurement value for a drill string positioned in a borehole for a hydrocarbon well. A system also can determine, responsive to a comparison of a target DTOB measurement value and the actual DTOB measurement value, a DTOB error value. Further, a system can determine, responsive to a comparison of a target toolface orientation measurement value and the actual toolface orientation measurement value, a toolface orientation error value. A system still further can determine a control command for one or more of a top drive and a drawworks responsive to the DTOB error value and the toolface orientation error value. Additionally, a system can operate one or more of the top drive and the drawworks responsive to the control command thereby to correct a toolface orientation of the drill string.

In some instances, determining the actual DTOB measurement value can include determining an actual downhole weight on bit (DWOB) measurement value. Additionally, determining the actual DTOB measurement value and the actual toolface orientation measurement value can be responsive to one or more of: (a) a Kalman filter and (b) one or more measurements at one or more sensors positioned within the borehole. Further, the controller can be in communication with one or more sensors positioned within the borehole through one or more segments of wired drill pipe. The one or more computer programs, when executed by the one or more processors, further can cause the system to determine a current top drive operation measurement value and a current drawworks operation measurement value. Additionally, the control command can be responsive to the current top drive operation measurement value and the current drawworks operation measurement value. Further, the control command can be for one or more of the top drive, the drawworks, and a mud pump, and the one or more computer programs, when executed by the one or more processors, further can cause the system to determine a current mud pump operation measurement value and to operate the mud pump responsive to the control command thereby to correct a toolface orientation of the drill string. In some circumstances, determining the actual DTOB measurement value and the actual toolface measurement value can include validating the one or more measurements at the one or more sensors thereby to produce one or more validated measurements and filtering the one or more validated measurements thereby to produce one or more filtered measurements. Further, determining the actual DTOB measurement value and the actual toolface measurement value can include reconciling the one or more filtered measurements thereby to produce one or more reconciled measurements and verifying the one or more reconciled measurements thereby to produce one or more verified measurements. In addition, determining the actual DTOB measurement value and the actual toolface measurement value can include remediating gross errors in the one or more verified measurements thereby to produce the actual DTOB measurement value and the actual toolface measurement value.

In addition, operation of the drawworks can include altering a weight on bit (WOB) measurement value at a surface of the borehole, and operation of the top drive can include altering one or more of an angle of the drill string with respect to the surface and a rotational speed of the drill string within the borehole. Further, the one or more computer programs, when executed by the one or more processors, also can cause the system to determine the target DTOB measurement value responsive to receipt of user input from a user computing device in communication with the controller. The user input can include one or more of: a preselected DTOB measurement value, a preselected rate of penetration, a preselected downhole WOB, and a preselected mud motor differential pressure. The one or more computer programs, when executed by the one or more processors, also can cause the system to determine the target toolface orientation measurement value responsive to receipt of the user input from the user computing device. Still further, the control command can be responsive to one or more dynamic models of the drill string within the borehole, and operation of the drawworks can control a rate of penetration of the drill string. The one or more computer programs, when executed by the one or more processors, can cause the system to estimate one or more future values of one or more downhole variables and to determine an optimal rate of penetration of the drill string responsive to a constrained optimization problem. Additionally, the control command can be responsive to the determined optimal rate of penetration of the drill string.

In addition to systems, embodiments of the invention can include methods to control directional drilling in borehole drilling for hydrocarbon wells. A method according to an embodiment can include, for example, determining an actual downhole torque on bit (DTOB) measurement value and an actual toolface orientation measurement value for a drill string positioned in a borehole for a hydrocarbon well. A method also can include determining, responsive to a comparison of a target DTOB measurement value and the actual DTOB measurement value, a DTOB error value. Further, a method can include determining, responsive to a comparison of a target toolface orientation measurement value and the actual toolface orientation measurement value, a toolface orientation error value. A method additionally can include determining a control command for one or more of a top drive and a drawworks responsive to the DTOB error value and the toolface orientation error value. Still further, a method can include operating one or more of the top drive and the drawworks responsive to the control command thereby to correct a toolface orientation of the drill string.

In some instances, determining the actual DTOB measurement value can include determining an actual downhole weight on bit (DWOB) measurement value. Further, determining the actual DTOB measurement value and the actual toolface orientation measurement value can be responsive to one or more of: (a) a Kalman filter and (b) one or more measurements at one or more sensors positioned within the borehole. Additionally, a method further can include receiving the one or more measurements from one or more sensors positioned within the borehole through one or more segments of wired drill pipe and determining a current top drive operation measurement value and a current drawworks operation measurement value. The control command also can be responsive to the current top drive operation measurement value and the current drawworks operation measurement value. Further, the control command can be for one or more of the top drive, the drawworks, and a mud pump, and the method also can include determining a current mud pump operation measurement value and operating the mud pump responsive to the control command thereby to correct a toolface orientation of the drill string. In some circumstances, determining the actual DTOB measurement value and the actual toolface measurement value can include validating the one or more measurements at the one or more sensors thereby to produce one or more validated measurements, as well as filtering the one or more validated measurements thereby to produce one or more filtered measurements. Determining the actual DTOB measurement value and the actual toolface measurement value also can include reconciling the one or more filtered measurements thereby to produce one or more reconciled measurements and verifying the one or more reconciled measurements thereby to produce one or more verified measurements. Further, determining the actual DTOB measurement value and the actual toolface measurement value can include remediating gross errors in the one or more verified measurements thereby to produce the actual DTOB measurement value and the actual toolface measurement value.

In addition, operation of the drawworks can include altering a weight on bit (WOB) measurement value at a surface of the borehole, and operation of the top drive can include altering one or more of an angle of the drill string with respect to the surface and a rotational speed of the drill string within the borehole. A method further can include determining the target DTOB measurement value responsive to receipt of user input from a user computing device. The user input can include one or more of: a preselected DTOB measurement value, a preselected rate of penetration, a preselected downhole WOB, and a preselected mud motor differential pressure. A method also can include determining the target toolface orientation measurement value responsive to receipt of the user input from the user computing device. Additionally, the control command can be responsive to one or more dynamic models of the drill string within the borehole. Further, operation of the drawworks can control a rate of penetration of the drill string. A method further can include estimating one or more future values of one or more downhole variables and determining an optimal rate of penetration of the drill string responsive to a constrained optimization problem. The control command also can be responsive to the determined optimal rate of penetration of the drill string.

BRIEF DESCRIPTION OF DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
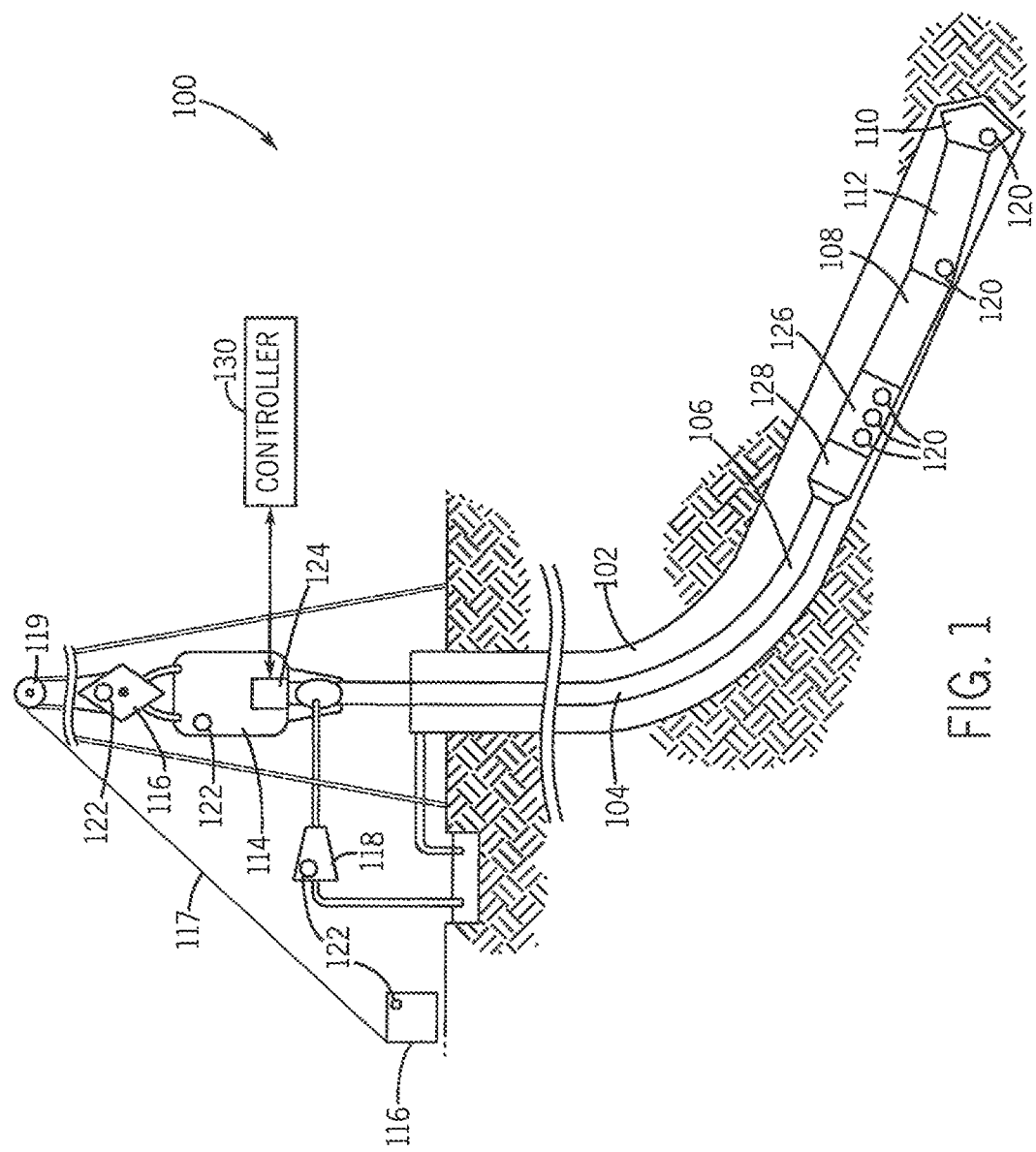
FIG. 1 is a schematic diagram of a system according to an embodiment of the invention.

So that the manner in which the features and advantages of the embodiments of systems, computer-readable media, interfaces, and methods of the present invention, as well as others, which will become apparent, may be understood in more detail, a more particular description of the embodiments of systems, computer-readable media, interfaces, and methods of the present invention briefly summarized above may be had by reference to the embodiments thereof, which are illustrated in the appended drawings, which form a part of this specification. It is to be noted, however, that the drawings illustrate only various embodiments of the embodiments of systems, computer-readable media, interfaces, and methods of the present invention and are therefore not to be considered limiting of the embodiments of systems, computer-readable media, interfaces, and methods of the present invention's scope as it may include other effective embodiments as well.

Systems, methods, and computer-readable media for autonomous direct controlled steering in directional drilling can use substantially online data transmission (that is, data transmission that can be accomplished during drilling) to take drilling parameter measurements at one or more downhole locations. Wired drill pipe, for example, can enable online data transmission, as can additional or other hardware and signals, as will be understood by those skilled in the art. These measurements can be used, along with data validation and reconciliation techniques, to produce reliable online information from downhole and surface variables in real-time intervals. Further, such direct control in autonomous directional drilling can be based on joint control of downhole torque on bit (DTOB) and toolface orientation while taking into consideration the coupling dynamics between torque and angular displacement in slide drilling. Additionally, control methods can adaptively predict the impact of changing downhole torque on the toolface orientation and can compensate accordingly for that impact in advance before it can influence the toolface angular displacement. In some instances, a closed-loop control of directional drilling can include a first set of control operations that ensure stability and robustness of automated directional drilling against a wide range of external disturbances, measurement errors, and unknown lithology and hydraulic conditions. Such a first set of control operations can be implemented fully either in a downhole device or in a surface application. Further, such a first set of control operations can be executed by a controller to issue operating commands to a drilling equipment system (including, for example, one or more of a rotating system, a hoisting system, a circulating system, and a downhole rotary steerable system (RSS)) that can either directly or indirectly affect one or more drilling parameters. Additionally, in some circumstances, a closed-loop control of directional drilling also can include a second set of control operations that can evaluate the drilling operating conditions and adaptively modify the first set of control operations thereby to alter the manner of issuing operating commands to one or more of a rotating system, a hoisting system, a circulating system, and a downhole RSS. The second set of control operations can include online adjusting the control parameters used as input to the first set of control operations, as well as choosing a suitable control structure from a database based on one or more if-then scenarios. Still further, a closed-loop control of directional drilling also can include a third set of control operations that can determine an optimal rate of penetration (ROP) online to enhance the overall directional drilling performance by estimating short- to mid-term future values of a preselected set of downhole variables and by solving a set of parametric constrained optimization problems. Each set of control operations can be associated with one or more separate controllers or other computing devices, or one or more sets of control operations can be associated with the same controller or other computing devices.

Embodiments of the invention can include, for example, systems to control directional drilling in borehole drilling for hydrocarbon wells. A system 100 according to an embodiment, for instance, can relate to a borehole 102 for a hydrocarbon well extending from a surface into subterranean material, as illustrated in FIG. 1, for example. Such a system 100 can include a drill string 104 positioned within the borehole 102. A drill string 104 can include one or more substantially cylindrical segments of drill pipe 106, a wire drilling line 117, a bottom hole assembly (BHA) 108, a drill bit 110, and a downhole drive controller 112 to control and adjust rotation of the drill bit 110. A downhole drive controller 112 can include, for example, a controller associated with the RSS. A drill bit 110 can be located at the bottom of the BHA 108, as illustrated in FIG. 1, for example. A system 100 further can include a top drive 114 or other rotating system positioned substantially at the surface and connected to the drill string 104. Operation of the top drive 114 can rotate the drill string 104 within the borehole 102 along an axis substantially parallel to the walls of the borehole 102. Such a top drive 114 can be a device or assembly made up of one or more components or machines (including, for example, one or more motors, one or more gears, and a rotary mechanism) that is operable to rotate the drill string 104 within the borehole 102. In addition, a system 100 can include a drawworks 116 or other hoisting system positioned substantially at the surface and connected to the drill string 104. The drawworks 116 can include a substantially cylindrical spool around which the wire drilling line 117 can be wound. Further, the drawworks 116 also can include a pulley 119 and a brake to inhibit unwinding of the wire drilling line 117 from the spool. Operation of the drawworks 116 can rotate the spool thereby to extend the wire drilling line 117 into the borehole 102 and, alternatively, to retract the wire drilling line 117 from the borehole 102. That is, operation of the drawworks 116 thereby can lower the drill string 104 into the borehole 102 and alternatively can reel the drill string 104 in from the borehole 102. Consequently, operation of the drawworks 116 can control ROP of the drill string 104. The drawworks 116 can be a device or assembly made up of one or more components or machines (including, for example, the wire drilling line 117, one or more spools, one or more pulleys 119, and one or more brakes) that is operable to hoist the drill string 104 in and out of the borehole 102. A system 100 also can include a mud pump 118 or other circulating system positioned substantially at the surface and connected to the drill string 104. Operation of the mud pump 118 can pump a drilling fluid through the one or more segments of drill pipe 106 and the BHA 108 of the drill string 104 to the drill bit 110. That is, such a mud pump 118 (or another circulating system) can pump a drilling fluid down via the drill pipe 106 where the drilling fluid subsequently can exit the drill string 104 via orifices in the drill bit 110 and then flow upwardly to the surface through the annulus of the borehole 102, as will be understood by those skilled in the art.

The drill bit 110, the downhole drive controller 112, a sensor assembly 126, the drill pipe 106, the top drive 114 (or other rotating system), the drawworks 116 (or other hoisting system), the mud pump 118 (or other circulating system), and any other drilling equipment (including those not illustrated in the example depicted in FIG. 1) each can include one or more high sampling rate drilling parameter sensors. For example, a system 100 can include a first set of one or more sensors positioned along the drill string 104 thereby defining one or more downhole sensors 120 (sometimes called downhole parameter sensors). As illustrated, downhole sensors 120 are positioned on or at the BHA 108 but can be positioned in other locations, as well, and need not be positioned in the locations illustrated in the example depicted in FIG. 1. A system 100 also can include a second set of one or more sensors positioned at the surface thereby defining one or more surface sensors 122. As illustrated, surface sensors 122 are rig-mounted sensors and positioned at the top drive 114, the drawworks 116, and the mud pump 118, but surface sensors 122 can be positioned at other locations, as well, and need not be positioned in the locations illustrated in the example depicted in FIG. 1. A drilling parameter sensor, such as a downhole sensor 120 or a surface sensor 122, can be any sensor operable to measure and provide raw data regarding at least one drilling parameter. Such a sensor can be mounted to any location available to sense the drilling parameter being monitored. Exemplary downhole sensors 120 can include (but are not limited to) direction measurement sensors, formation and wellbore evaluation sensors, sensors for determining the performance and physical condition of the BHA 108 and the drill bit 110, mud motor parameter sensors, and sensors for determining the operating condition of the drill string 104, as will be understood by those skilled in the art. Exemplary surface sensors 122 can include (but are not limited to) sensors for measuring variables related to the drill string 104, such as load, torque, position, velocity, acceleration, and vibration, as well as sensors for measuring the fluid-related variables such as mud pressure, mud flow rate, and casing annular pressure and temperature, as will be understood by those skilled in the art.

Figure 5:
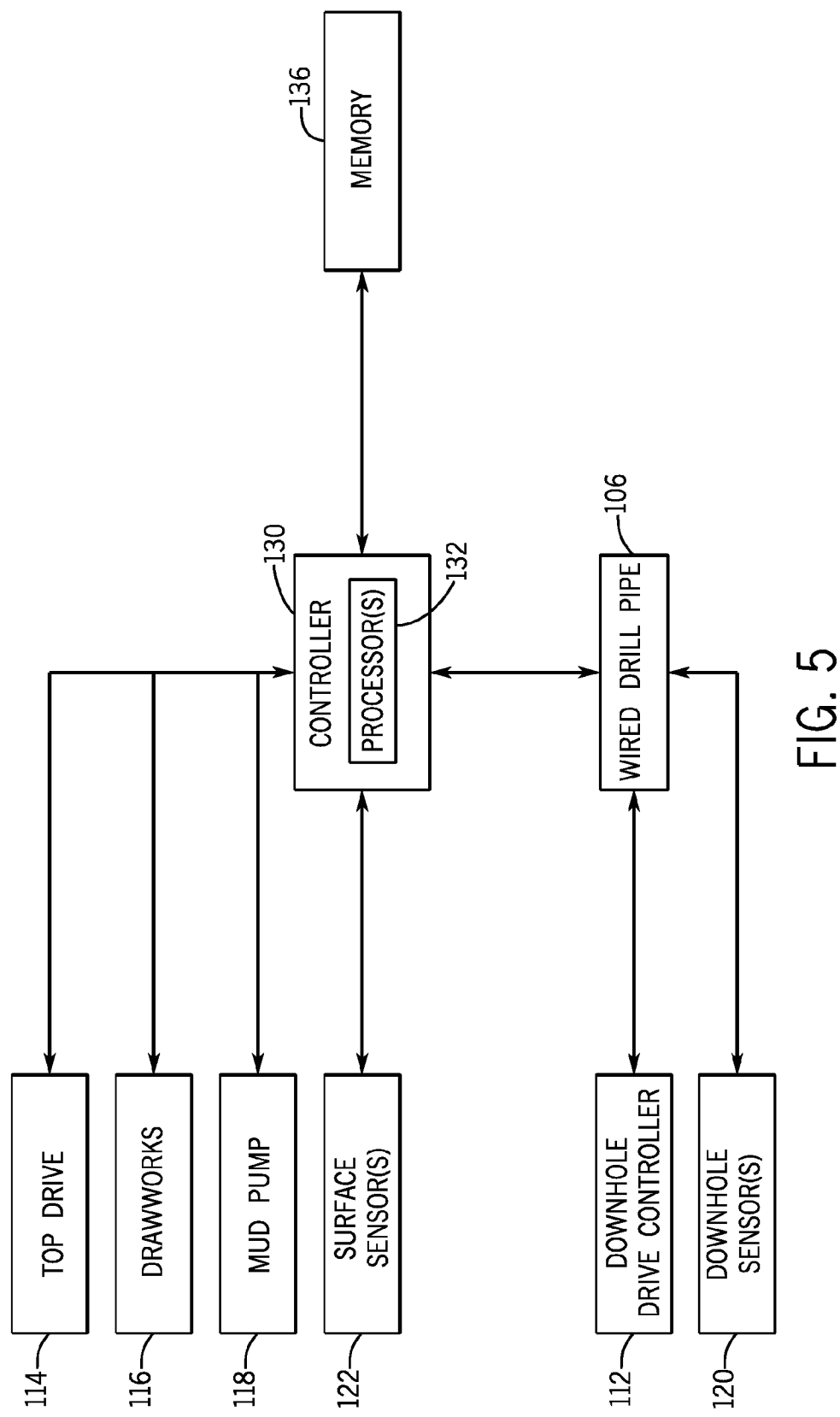
FIG. 5 is a schematic diagram of a system according to an embodiment of the invention.

A system 100 also can include a controller 130 positioned at the surface. A controller 130 can include one or more processors 132 and can be in communication with the downhole drive controller 112, the top drive 114, the drawworks 116, the mud pump 118, the one or more downhole sensors 120, and the one or more surface sensors 122, as illustrated in FIG. 5, for example. A downhole communication hub 128 can be operable to collect data from different downhole sensors 120 and to transmit the collected data to the surface via a substantially online data transmission system 124, in some circumstances, as illustrated in FIG. 1, for example. The communications hub 128 also can be operable to receive operating instructions and control signals from the surface and relay those signals to one or more downhole sensors 120, the downhole drive controller 112, or other downhole tools. Such a substantially online data transmission system 124 can be any system suitable for the continuous transmission of measurement data, control commands, and other signals between downhole and the surface in real-time intervals of, for example, one second. Exemplary communication methods can include, but are not limited to, direct communication via electric signals along wired drill pipe (such as drill pipe 106), mud-pulse telemetry, fiber optics, wireless signals, acoustic signals, and electromagnetic signals. For example, a data transmission system 124 can include a wired drill pipe 106 that in turn includes conductors coupled to the drill pipe 106 to provide a direct link between downhole and the surface. For example, in some instances, the controller 130 can be in communication with the downhole drive controller 112 and the one or more downhole sensors 120 through the one or more segments of drill pipe 106, for example, as illustrated in FIG. 5. The data transmission system 124 can be connected to a surface data network (such as a network to which the controller 130 also is connected) via a surface communications link that can be integrated into a component such as a swivel, internal blow out preventer (IBOP) or into an instrumented saver sub coupled to the drill string 104. Consequently, the controller 130 can be in communication with the data transmission system 124, as illustrated in FIG. 1, for example.

A system 100 also can include a non-transitory computer-readable medium (such as a memory 136) in communication with the one or more processors 132 of the controller 130. The computer-readable medium 136 can have one or more computer programs stored thereon that, when executed by the one or more processors 132, cause the system 100 to perform certain steps. For example, the system 100 can receive user input from a user, such as a directional driller, before performing additional steps. For instance, a system 100 can determine a target downhole torque on bit (DTOB) measurement value (that is, a targeted DTOB value to be measured by one or more downhole sensors 120) responsive to receipt of user input from a user computing device in communication with the controller 130. Further, for example, a user such as a directional driller can preselect a desired or target DTOB, or a target DTOB can be calculated from or otherwise determined based on some other preselected target value, such as ROP, WOB, or mud motor differential pressure. As an alternative or in addition to determining a target DTOB, a system 100 can determine a target downhole WOB (DWOB) measurement value (that is, a targeted DWOB value to be measured by one or more downhole sensors 120) responsive to receipt of user input from the user computing device. A system 100 also can determine a target toolface orientation measurement value (that is, a targeted toolface orientation value to be measured by one or more downhole sensors 120) responsive to receipt of the user input from the user computing device. As an alternative to a directional driller's preselection of these target values, any or all of the target values can be automatically computed by a drilling path planner, for example, in some circumstances.

Further, a system 100 can determine—responsive to one or more measurements at the one or more downhole sensors 120—an actual toolface orientation measurement value (that is, an actual toolface orientation value as measured by one or more downhole sensors 120) and one or more of an actual DTOB measurement value (that is, an actual DTOB value as measured by one or more downhole sensors 120) and an actual DWOB measurement value (that is, an actual DWOB value as measured by one or more downhole sensors 120). For example, when a target DTOB measurement value has been determined, a system 100 can determine an actual DTOB measurement value; when a target DWOB has been determined, a system 100 can determine an actual DWOB measurement value. A system 100 also can determine—responsive to one or more measurements at the one or more surface sensors 122—one or more of a current top drive operation measurement value, a current drawworks operation measurement value, and a current mud pump operation measurement value.

In addition, a system 100 can determine one or more of a DTOB error value and a DWOB error value. For example, when a target DTOB measurement value and an actual DTOB measurement value have been determined, a DTOB error value can be determined responsive to a comparison of the target DTOB measurement value to the actual DTOB measurement value. As an alternative to or in addition to determining a DTOB error value, for example, a DWOB error value can be determined—responsive to a comparison of the target DWOB measurement value to the actual DWOB measurement value—when a target DWOB measurement value and an actual DWOB measurement value have been determined. For example, the actual DTOB measurement value can be compared to the target DTOB measurement value to generate one or more of torque position error ($E_{TOB}$), torque velocity error ($\Delta E_{TOB}$), and torque acceleration error ($\Delta^2 E_{TOB}$). Each of these error variables then can be scaled using a corresponding, in some instances nonlinear, scale function (such as, for example, $SE_{TOB}$, $S\Delta E_{TOB}$, and $S\Delta^2 E_{TOB}$) that can determine the general sensitivity of control logic with respect to different values of the respective error variable. Likewise, the actual DWOB measurement value can be compared to the target DWOB measurement value to generate one or more of weight position error ($E_{WOB}$), weight velocity error ($\Delta E_{WOB}$), and weight acceleration error ($\Delta^2 E_{WOB}$). Each of these error variables then can be scaled using a corresponding, in some instances nonlinear, scale function (such as, for example, $SE_{WOB}$, $S\Delta E_{WOB}$, and $S\Delta^2 E_{WOB}$) that can determine the general sensitivity of control logic with respect to different values of the respective error variable. Each scale function can be determined analytically or using a knowledge-based approach.

In a similar manner, a system 100 can determine, responsive to a comparison of the target toolface orientation measurement value and the actual toolface orientation measurement value, a toolface orientation error value. For example, the actual toolface orientation measurement value can be compared to the target toolface orientation measurement value to generate one or more of position error $E_{toolface}$, velocity error $\Delta E_{toolface}$, and acceleration error $\Delta^2 E_{toolface}$ that then can be scaled using one or more (in some instances, nonlinear) scale functions, such as, for example, $SE_{toolface}$, $S\Delta E_{toolface}$, and $S\Delta^2 E_{toolface}$.

A system 100 then can determine a control command for one or more of the top drive 114, the drawworks 116, and the mud pump 118 to correct each of the toolface orientation error value and the one or more of the DTOB error value and the DWOB error value responsive to the one or more of the current top drive operation measurement value, the current drawworks operation measurement value, and the current mud pump operation value, for example. A control command for the top drive 114 can be responsive to the current top drive operation measurement value, for instance, and a control command for the drawworks 116 can be responsive to the current drawworks operation measurement value. A control command for the mud pump 118 can be responsive to the current mud pump operation measurement value. Further, a system 100 can operate one or more of the top drive 114, the drawworks 116, and the mud pump 118 responsive to the control command, which can include one or more commands for the respective equipment. Operation of the drawworks 116 can include altering an ROP, and consequently a WOB, measurement value at the surface. Further, operation of the top drive 114 can include altering one or more of an angle of the drill string 104 with respect to the surface and a rotational speed of the drill string 104 within the borehole 102. In addition, operation of the mud pump 118 can include altering a flow rate measurement value of the drilling fluid at the surface and, as a result, a fluid differential pressure (DiffP) at the surface. Consequently, operation of one or more of the top drive 114, the drawworks 116, and the mud pump 118 responsive to the control command thereby eventually can correct one or more of a toolface orientation of the drill string 104, a DTOB, and a DWOB.

A system 100 also can perform data validation and reconciliation operations. The raw measurement data obtained by downhole sensors 120 and surface sensors 122 may not be fully correct as a result of measurement errors. Measurement errors can be categorized into two basic types: (1) random errors that can result from intrinsic sensor accuracy and (2) gross or systematic errors that can result from sensor calibration or faulty data transmission. Data validation and reconciliation operations can use filtering and estimation techniques to produce a single consistent set of data that represent the most likely value of a drilling parameter in real-time intervals of, for example, one second, while the raw data measured by the downhole sensors 120 and surface sensors 122 can exceed, for example, 50 Hz in sampling rate.

Figure 3:
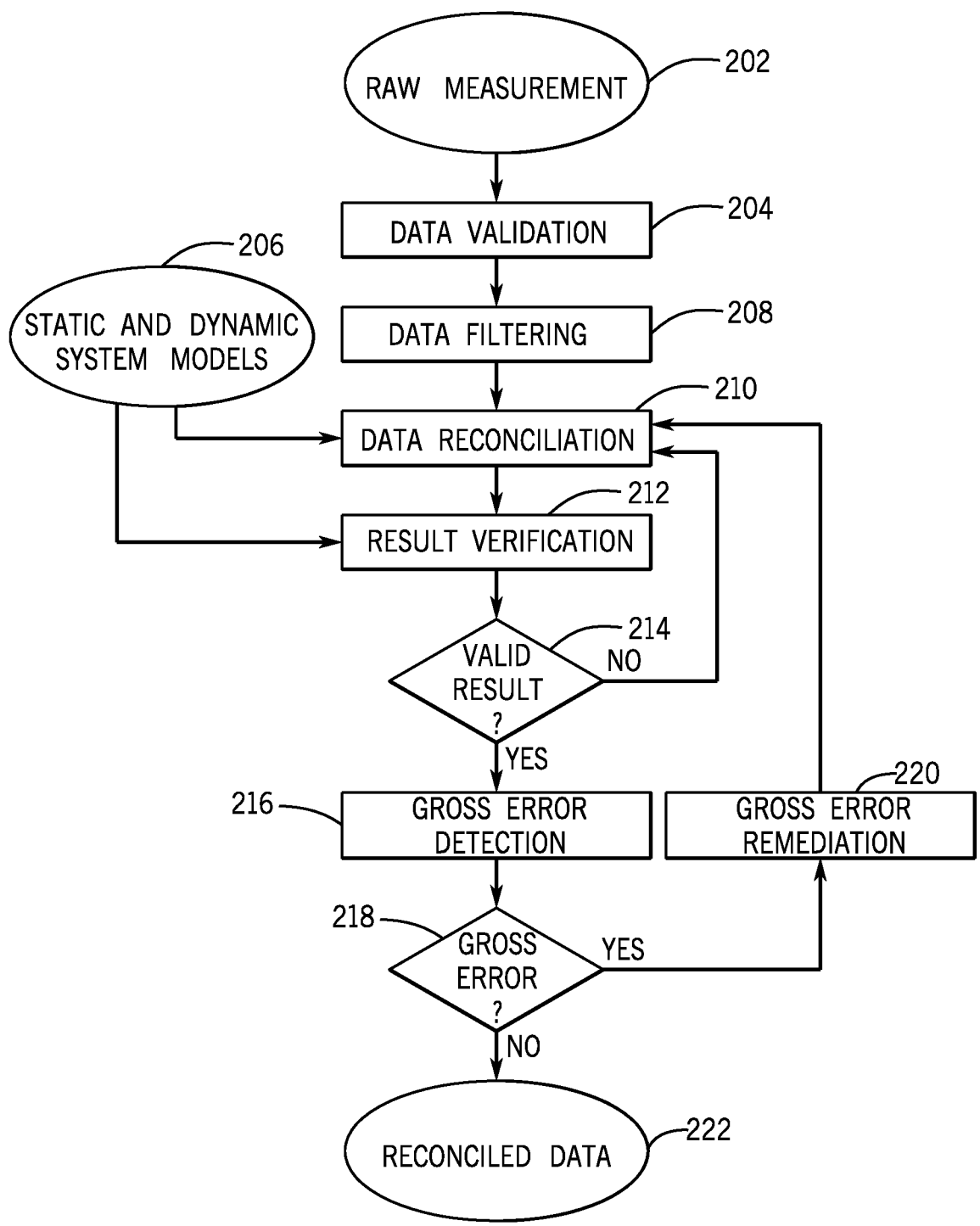
FIG. 3 is a schematic diagram of a method according to an embodiment of the invention.

Exemplary data validation and reconciliation operations are illustrated, for instance, in FIG. 3. For example, in some circumstances, determining the actual toolface measurement value and the one or more of the actual DTOB measurement value and the actual DWOB measurement value can include validating 204 the one or more measurements at the one or more downhole sensors 120 (such as high sampling rate raw measurement data 202) thereby to produce one or more validated measurements, as illustrated in FIG. 3, for example. Validating 204 the one or more measurements, which can have been sampled at a high rate, can provide certain improvements to the fitness, accuracy, and consistency of the measured values. Exemplary validation 204 operations can include, but are not limited to, examining data for consistency within a minimum and maximum expected range, discarding isolated data that deviate significantly from neighboring data measurements, cleaning data from spike faults when the rate of change in a gradient of measurement data over a specific period of time is much greater than expected, and monitoring stuck-at fault or frozen data where a series of measurement data remain with little or no variation for a period of time greater than expected.

Data validation and reconciliation operations also can include filtering 208 the validated data. For example, determining the actual toolface measurement value and the one or more of the actual DTOB measurement value and the actual DWOB measurement value also can include filtering 208 the one or more validated measurements thereby to produce one or more filtered measurements. Filtering 208 the one or more validated measurements can attenuate noise components of the measurement data. Exemplary filtering 208 methods can include, but are not limited to, taking the simple average of measured values over a specific time period, taking the moving average based on a specific moving time window, taking the exponentially weighted moving average that places greater importance on more recent data by discounting older data in an exponential manner, using local regression methods, and applying Savitzky-Golay filtering.

In addition, data validation and reconciliation operations can include reconciling 210 the filtered data. For instance, determining the actual toolface measurement value and the one or more of the actual DTOB measurement value and the actual DWOB measurement value further can include reconciling 210 the one or more filtered measurements thereby to produce one or more reconciled measurements. Reconciling 210 the one or more filtered measurements can correct random errors. From a statistical viewpoint, a main assumption in data reconciliation can be that no gross errors exist in the set of measurements, since gross errors can bias the reconciliation results and reduce the robustness of the reconciliation. Given n measurements for each variable in a set of m variables, data reconciliation can be expressed as an optimization problem of the following form:

$$\text{minimize } f(y^*) = \sum_{p=1}^{m} \sum_{i=1}^{n} \left( \frac{y_i^p - y^{p*}}{\sigma^p} \right)^2$$

$$\text{subject to } y_{min} \leq y^* \leq y_{max} \text{ and } F(y^*) = 0$$

where $f(y^*)$ can be called a measurement penalty function, σ can be the variance of the random noise, $y_{min}$ and $y_{max}$ can be bounds on the measured variables, and $F(y^*)=0$ can represent a set of model equations 206 that express the general structure of the process as functions of reconciled data. Models 206 can have different levels of detail. For example, a model 206 can incorporate simple static material balances or advanced dynamic models.

Data validation and reconciliation operations also can include verifying 212 the reconciled data. For example, determining the actual toolface measurement value and the one or more of the actual DTOB measurement value and the actual DWOB measurement value also can include verifying 212 the one or more reconciled measurements thereby to produce one or more verified measurements. Result verification 212 can include, but is not limited to, measurement penalty analysis for determining the reliability of the reconciliation and bound checks to ensure that the reconciled values lie in a certain reasonable bounds. Result verification 212 can utilize analytical redundancy-based methods where an analytical model 206 is used to provide estimates of measured variables. This redundancy then can be used to detect any discrepancy or residual between the reconciled data and expected values. The analytical model 206 can be mathematical or knowledge-based. Exemplary model-based techniques can include, but are not limited to, an observer-based approach, a parity-space approach, a parameter identification-based approach, and a Kalman filter approach. After result verification 212, data validation and reconciliation operations can include determining whether a valid result has been produced 214. If a valid result has not been produced at step 214, data reconciliation 210 can begin again. If a valid result has been produced at step 214, however, data validation and reconciliation operations can proceed.

Data validation and reconciliation operations still further can include detecting 216 and remediating 220 gross errors in the verified data. For example, determining the actual toolface measurement value and the one or more of the actual DTOB measurement value and the actual DWOB measurement value can include remediating gross errors 220 in the one or more verified measurements thereby to produce the actual toolface measurement value and the one or more of the actual DTOB measurement value and the actual DWOB measurement value. Gross error detection 216 can indicate whether a gross error exists somewhere in the set of measurements at step 218, for instance. In some circumstances, it can be assumed that the measurement errors are normally distributed. Then, if no gross errors exist in the set of measurements, each penalty term in $f(y^*)$ can be a random variable that is normally distributed with a mean equal to 0 and a variance equal to 1. By consequence, the measurement penalty function $f(y^*)$ can be a random variable which follows a chi-square distribution, since it is the sum of the square of normally distributed random variables. This can lead to an exemplary gross error detection approach that can include comparing the value of the objective function $f(y^*)$ with a given percentile $P_\alpha$ of the probability density function of a chi-square distribution that can give an indication of whether a gross error exists. In such an example, if $f(y^*) \leq P_{90}$, no gross errors exists with a 90% probability. Another exemplary gross error detection approach can include an individual test that compares each penalty term in $f(y^*)$ with the critical values of the normal distribution, and if the i-th penalty term is outside, for example, the 90% confidence interval of the normal distribution, then this measurement has a gross error with 90% probability. If no gross error exists somewhere in the set of measurements at step 218, data validation and reconciliation operations can conclude and produce low sampling rate reconciled data 222. If a gross error exists somewhere in the set of measurements at step 218, gross remediation 220 can begin.

Gross error remediation 220 can include either discarding or relaxing measurement systematic errors that can bias the reconciliation results. In some circumstances, gross error remediation 220 can include determining the measurement data that are biased by a systematic error and discarding these data from the data set. The determination of the measurement to be discarded can be based on different kinds of penalty terms that express the degree to which the measured values deviate from the reconciled values. After gross errors have been discarded from the measurement data, data reconciliation 210 can be performed without these erroneous data that can spoil the reconciliation process. In some instances, the elimination can be repeated until no gross error exists in the set of reconciled data. Further, in some circumstances where it is not possible to determine which measurement data are responsible for systematic errors, gross error remediation 220 can rely on relaxing the estimate for the uncertainty of suspicious measurements so that the reconciled values lie within, for example, the 90% confidence interval.

In some circumstances, a control command can be responsive to one or more dynamic models of the drill string 104 within the borehole 102. For example, the actual toolface orientation measurement value and the one or more of the actual DTOB measurement value and the actual DWOB measurement value can be used to estimate a drill string torsional compliance by analyzing the coupling dynamics between toolface angular displacement and DTOB. In some instances, the torsional compliance can be estimated using a drill string dynamic model that can be mathematical or knowledge-based. In other instances, the torsional compliance can be estimated by calculating the torsional compliance using actual observations at near past times that show the angular toolface displacements as a response to the downhole torque variations. In yet other instances, the torsional compliance can be estimated using a combination of a drill string dynamic model and actual observations, where the actual observations also can be used to update the drill string dynamic model.

Additionally, in some circumstances, the one or more computer programs, when executed by the one or more processors 132, can cause the system 100 to estimate one or more future values of one or more downhole variables and to determine an optimal ROP of the drill string 104 responsive to a constrained optimization problem. Further, the control command can be responsive to the determined optimal ROP.

A control command can be for each of the top drive 114, the drawworks 116, and the mud pump 118, or for any combination of them. In some circumstances, determining the control command can include using multi-input, multi-output (MIMO) core logic to determine the control command. Further, the MIMO core logic can include a plurality of decision rules, and each of the decision rules can be associated with one or more of: drawworks control, top drive control, and mud pump control. The outcome of each decision rule can be scaled by a weight factor that, according to drilling conditions, can determine the impact of that decision rule on the final control command. An aggregation logic then can be used to combine the weighted results from different decision rules and to produce quantifiable control command(s) for one or more of the top drive 114, the drawworks 116, and the mud pump 118. Exemplary MIMO control logic can include, but is not limited to, a multivariable fuzzy logic controller and a multivariable model predictive controller.

Alternatively, in other circumstances, determining the control command can include using a first single-input, single-output (SISO) control logic to determine the control command for the top drive 114 and a second SISO control logic to determine the control command for the drawworks 116. Exemplary SISO control logic can include, but is not limited to, a conventional proportional-integral-derivative (PID) controller and fuzzy logic controller, as will be understood by those skilled in the art.

Figure 4:
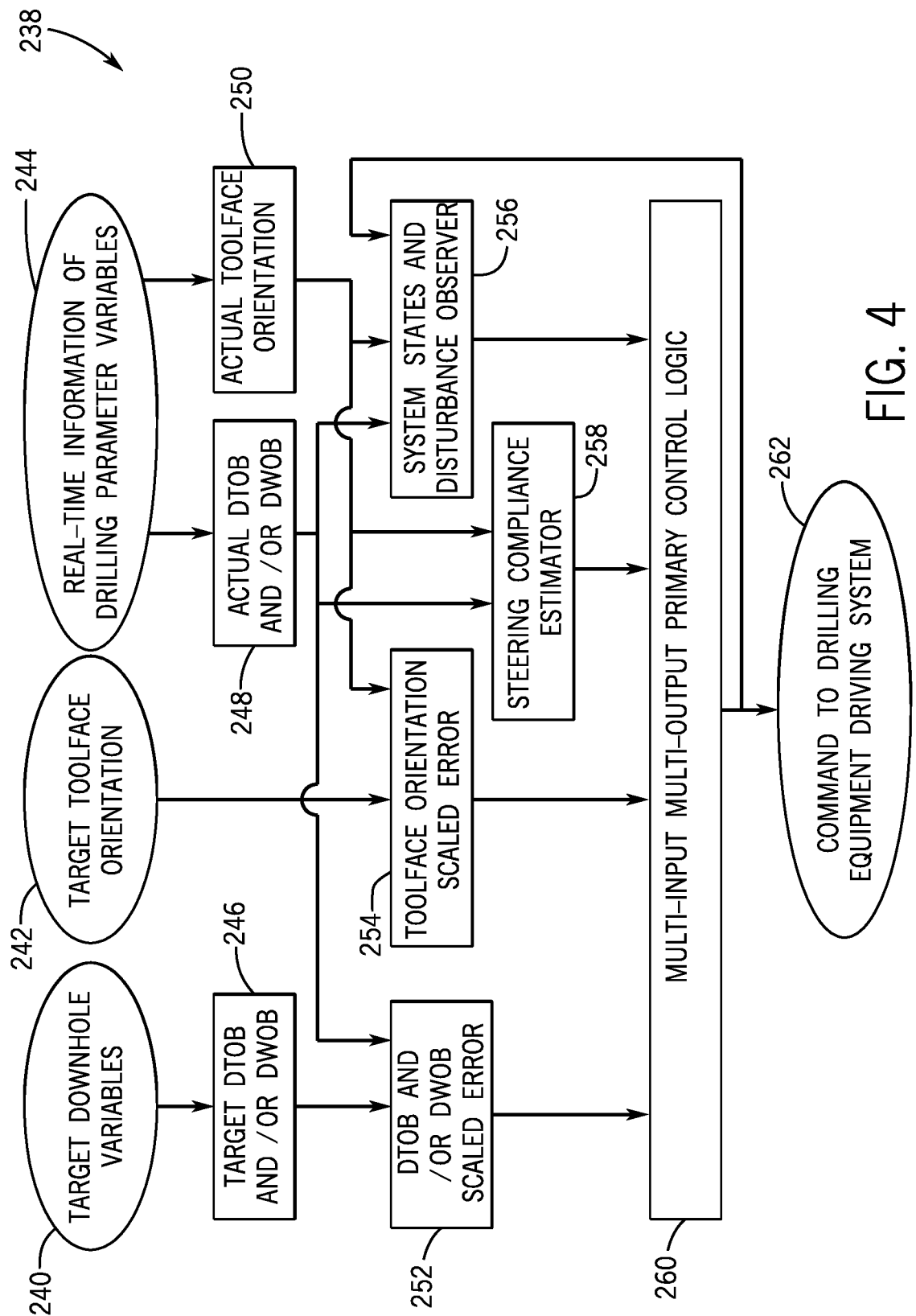
FIG. 4 is a schematic diagram of a method according to an embodiment of the invention.

For example, exemplary operations of a system or exemplary steps of a method 238 according to an embodiment are illustrated in FIG. 4. As depicted, inputs can include desired (that is, target) downhole variables 240, target toolface orientation 242, and real-time information of drilling parameter variables 244. Such real-time information of drilling parameter variables 244 can be obtained from one or more sensors, such as downhole sensors 120 or surface sensors 122. Given the desired downhole variables 240, one or more of a target DWOB and a target DTOB 246 can be determined. Further, given the real-time information of drilling parameter variables 244, one or more of an actual DWOB and an actual DTOB 248, as well as an actual toolface orientation 250, can be determined. Given one or more of a target DWOB and a target DTOB 246 and one or more of an actual DWOB and an actual DTOB 248, one or more of a DWOB scaled error and a DTOB scaled error 252 can be determined. Further, given the target toolface orientation 242 and the actual toolface orientation 250, a toolface orientation scaled error 254 can be determined. A system states and disturbance observer 256 then can operate responsive to the actual toolface orientation 250 and one or more of the actual DWOB and the actual DTOB 248. Further, a steering compliance estimator 258 can estimate the drill string torsional compliance responsive to the actual toolface orientation 250 and one or more of the actual DWOB and the actual DTOB 248. Given the toolface orientation scaled error 254, one or more of DWOB scaled error and DTOB scaled error 252, estimate from the steering compliance estimator 258, and input from the system states and disturbance observer 256, multi-input multi-output (MIMO) control logic 260 can operate to determine a command 262 to send to one or more drilling equipment driving systems. Output of the MIMO control logic 260 also can feed back into the system states and disturbance observer 256 to be used for subsequent time-step calculations.

Figure 7:
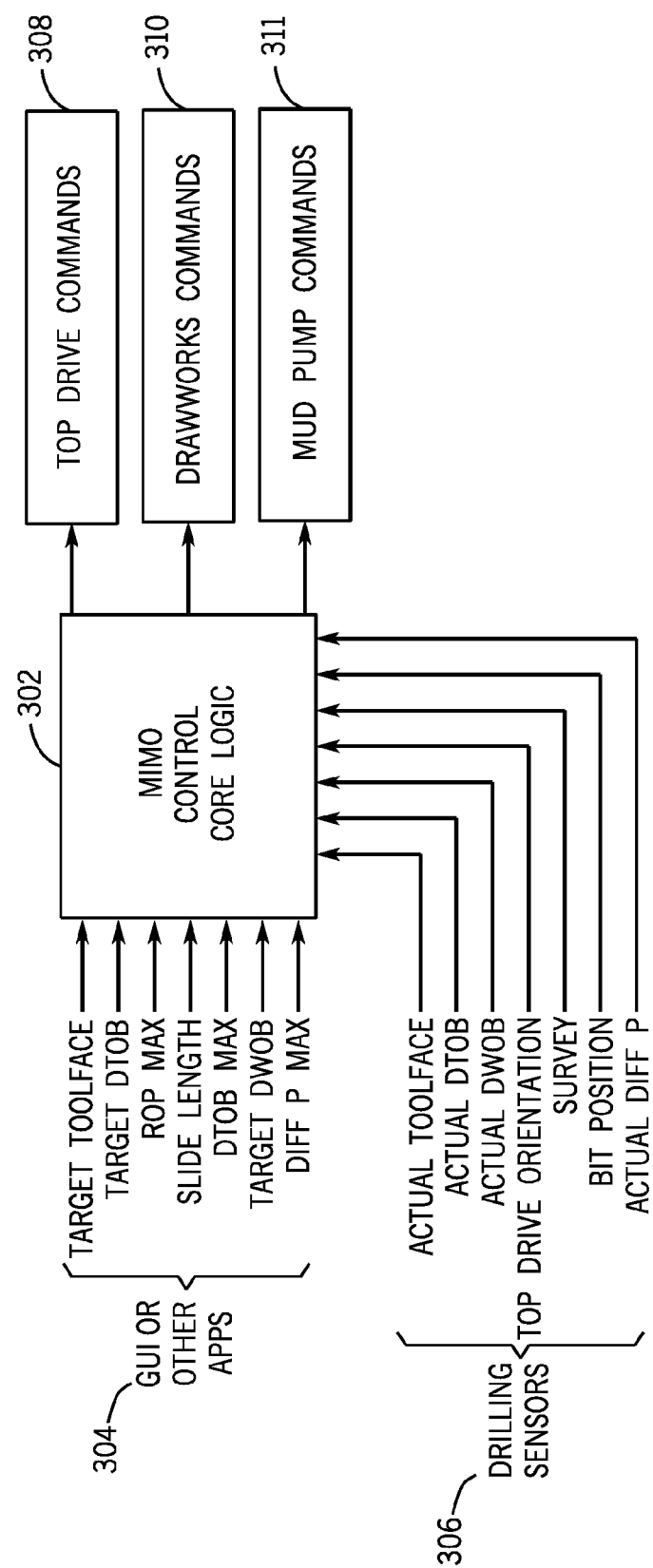
FIG. 7 is a schematic diagram of a system according to an embodiment of the invention.
Figure 8A:
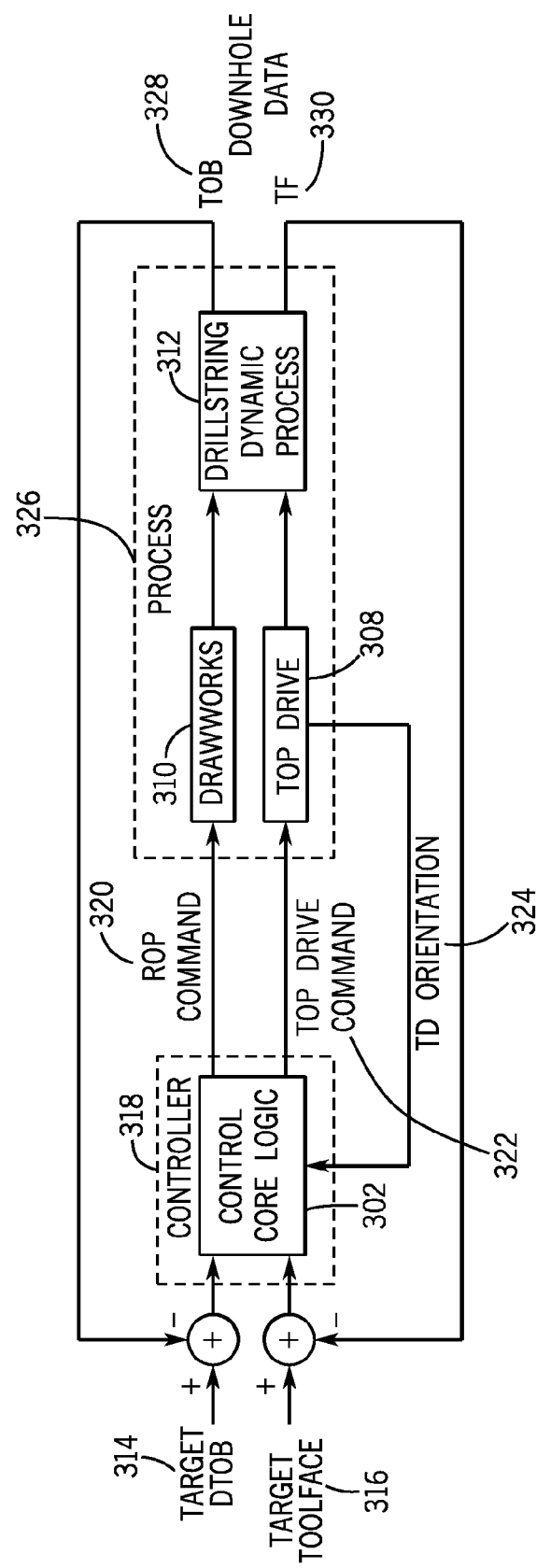
FIG. 8A is a schematic diagram of a system according to an embodiment of the invention.
Figure 8B:
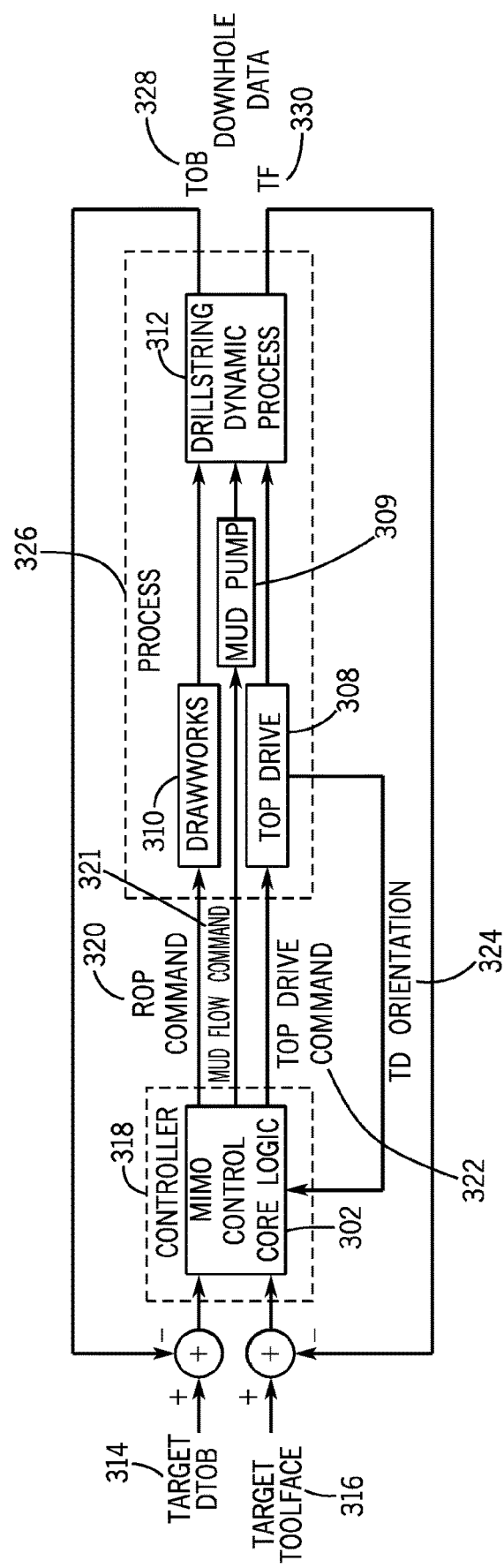
FIG. 8B is a schematic diagram of a system according to an embodiment of the invention.

MIMO control logic can take into account the mutual effects among downhole torque, toolface orientation, top drive angle, and ROP, for example, as illustrated in FIG. 7 and FIG. 8. For instance, MIMO control logic 302 can utilize input from a user through a graphical user interface (GUI) or another application 304, as well as input from one or more drilling sensors 306, as illustrated in FIG. 7. Input from a user through a graphical user interface (GUI) or another application 304 can include, for example, toolface orientation (TF) setpoint (that is, target toolface orientation), DTOB setpoint (that is, target DTOB), DWOB setpoint (that is, target DWOB), maximum ROP, maximum DiffP, slide length, maximum DTOB, and pipe tally, as will be understood by those skilled in the art. Further, input from one or more downhole drilling sensors 306 (such as downhole sensors 120, for example) can include actual toolface orientation, actual DTOB, actual DWOB, and actual downhole differential pressure (DDiffP), as will be understood by those skilled in the art. Still further, input from one or more surface drilling sensors 306 (such as surface sensors 122, for example) can include top drive (TD) orientation, ROP, WOB, DiffP, block height, hole depth, drill bit position, and survey, as will be understood by those skilled in the art. The output of the MIMO control logic 302 can include control commands to a top drive 308 regarding top drive orientation. Such control commands 308 can include one or more of angular position, throttle, and torque. Further, the output of the MIMO control logic 302 can include commands to a drawworks 310 regarding ROP. Such drawworks commands 310 can include drilling line payoff, WOB, and DiffP. Still further, the output of the MIMO control logic 302 can include commands to a mud pump 311 regarding mud flow that can include mud pump strokes. For example, a controller 318 using the MIMO core logic 302 can utilize target DTOB 314 and a target toolface orientation 316 as inputs to generate a surface ROP command 320 that can be sent to a drawworks 310, as well as a surface top drive orientation command 322 that can be sent to a top drive 308, as illustrated in FIG. 8A, for example. Top drive 308 can provide feedback regarding top drive orientation 324 to the MIMO control logic 302. In the drilling process 312, the operation of the drawworks 310 and top drive 308 then can modify DTOB and toolface orientation to produce updated DTOB 328 and TF 330. These updated drilling parameter measurements then can be fed back into the MIMO control logic 302 to be used for subsequent time-step calculations. In some instances, the controller 318 also can send a mud flow command 321 to a mud pump 309, which can feed into the MIMO control logic 302, as illustrated in FIG. 8B, for example.

Figure 9:
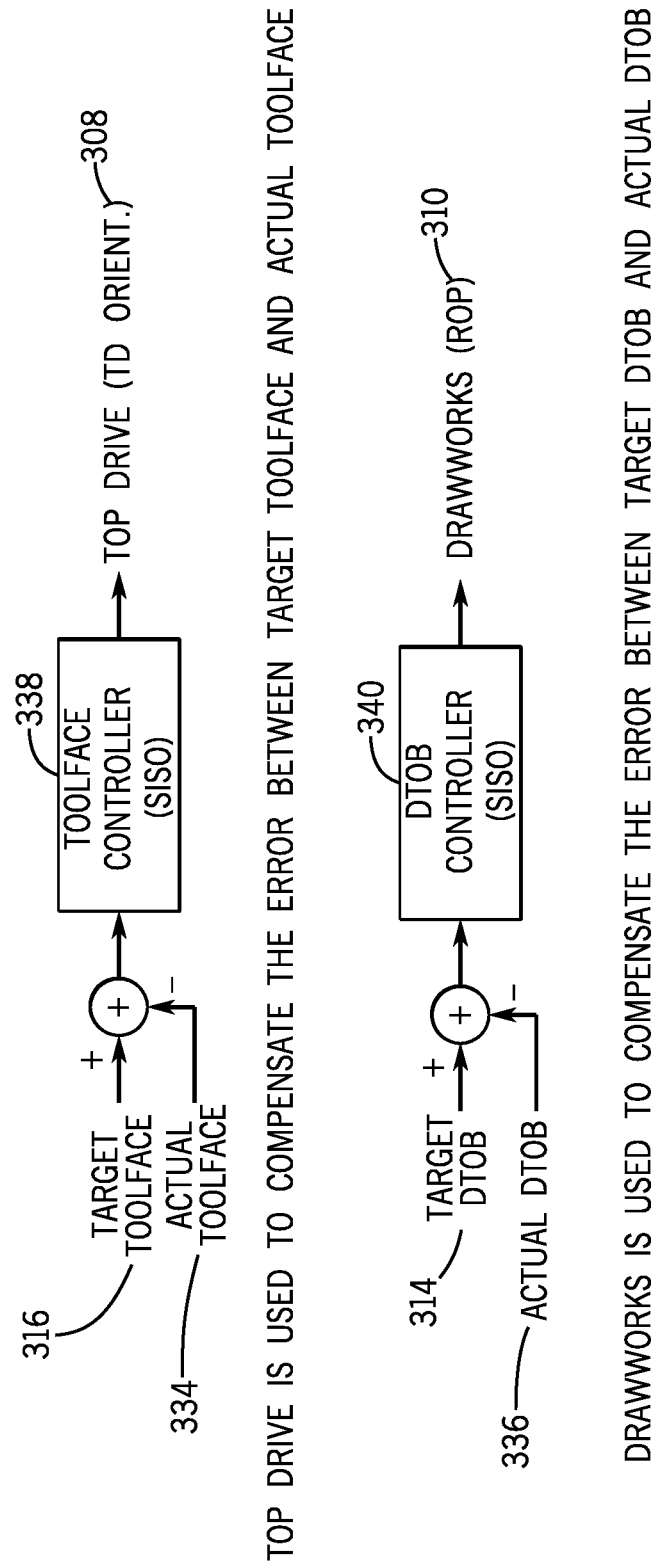
FIG. 9 is a schematic diagram of a system according to an embodiment of the invention.

As an alternative to MIMO control logic 302, two disjointed SISO controllers (one for each of top drive orientation and surface ROP) can be used, as illustrated in FIG. 9, for example. Each independent SISO controller can compare its setpoint with its corresponding downhole actual value and accordingly can generate a command to the process. For instance, a SISO control logic performed by a controller associated with TF 338 can use TF setpoint 316 and actual TF 334 as inputs to determine a command to send to a top drive 308. Top drive can be used to compensate for error between the TF setpoint 316 and the actual TF 334. That is, operation of the top drive can be used to correct toolface orientation. Similarly, a SISO control logic performed by a controller associated with DTOB 340 can use DTOB setpoint 314 and actual DTOB 336 as inputs to determine a command to send to a drawworks 310. Drawworks can be used to compensate for error between the DTOB setpoint 314 and the actual DTOB 336. That is, operation of the drawworks can be used to correct DTOB.

Another system according to an embodiment can include a controller 130 that includes one or more processors 132. A system also can include a non-transitory computer-readable medium 136 in communication with the one or more processors 132 of the controller 130. The computer-readable medium 136 can have one or more computer programs stored thereon that, when executed by the one or more processors 132, cause the system to determine an actual downhole torque on bit (DTOB) measurement value and an actual toolface orientation measurement value for a drill string 104 positioned in a borehole 102 for a hydrocarbon well. As an alternative to or in addition to determining the actual DTOB measurement value, a system can determine a DWOB measurement value; in such circumstances, steps performed by the system related to DTOB can instead be related to DWOB. A system also can determine, responsive to a comparison of a target DTOB measurement value and the actual DTOB measurement value, a DTOB error value. As an alternative to or in addition to determining the DTOB error value, a system can determine a DWOB error value. Further, a system can determine, responsive to a comparison of a target toolface orientation measurement value and the actual toolface orientation measurement value, a toolface orientation error value. In addition, a system can determine a control command for one or more of a top drive 114 and a drawworks 116 responsive to the DTOB error value (and/or the DWOB error value) and the toolface orientation error value. A system further can operate one or more of the top drive 114 and the drawworks 116 responsive to the control command thereby to correct a toolface orientation of the drill string 104.

In some instances, determining the actual DTOB measurement value can include determining an actual DWOB measurement value. Additionally, the actual DTOB measurement value can be a sensor measurement value, and the actual DWOB measurement value can be a sensor measurement value, as well. Further, determining the actual DTOB measurement value and the actual toolface orientation measurement value can be responsive to one or more of: (a) one or more measurements at one or more sensors 120 positioned within the borehole 102 and (b) an appropriate estimator, such as a Kalman filter. For example, DTOB and toolface orientation can be obtained or estimated from measurements by downhole sensors 120 or estimated by an appropriate estimator (such as a Kalman filter, for example) or a combination of both.

The controller 130 can be in communication with the one or more sensors 120 through one or more segments of wired drill pipe 106, in some circumstances. Further, a system also can determine a current top drive operation measurement value and a current drawworks operation measurement value, and the control command can be responsive to the current top drive operation measurement value and the current drawworks operation measurement value. In some instances, the control command can be for one or more of the top drive 114, the drawworks 116, and a mud pump 118. The one or more computer programs, when executed by the one or more processors 132, further can cause the system to determine a current mud pump operation measurement value and to operate the mud pump 118 responsive to the control command thereby to correct a toolface orientation of the drill string 104.

Additionally, in some circumstances, determining the actual DTOB measurement value and the actual toolface measurement value can include validating the one or more measurements at the one or more sensors 120 thereby to produce one or more validated measurements and filtering the one or more validated measurements thereby to produce one or more filtered measurements. Determining the actual DTOB measurement value and the actual toolface measurement value also can include reconciling the one or more filtered measurements thereby to produce one or more reconciled measurements and verifying the one or more reconciled measurements thereby to produce one or more verified measurements. Further, determining the actual DTOB measurement value and the actual toolface measurement value can include remediating gross errors in the one or more verified measurements thereby to produce the actual DTOB measurement value and the actual toolface measurement value.

Operation of the drawworks 116 can include altering a weight on bit (WOB) measurement value at a surface of the borehole, and operation of the top drive 114 can include altering one or more of an angle of the drill string 104 with respect to the surface and a rotational speed of the drill string 104 within the borehole 102.

Further, the control command can be responsive to one or more dynamic models of the drill string 104 within the borehole 102, and operation of the drawworks 116 can control ROP of the drill string 104. A system also can estimate one or more future values of one or more downhole variables and determine an optimal ROP of the drill string 104 responsive to a constrained optimization problem. In addition, the control command can be responsive to the determined optimal ROP of the drill string 104.

In some circumstances, the one or more computer programs, when executed by the one or more processors 132, further can cause the system determine the target toolface orientation measurement value responsive to receipt of user input from a user computing device in communication with the controller 130 and to determine the target DTOB measurement value (and/or the target DWOB measurement value) responsive to receipt of the user input from the user computing device. Such user input can include, for example, one or more of: a preselected DTOB measurement value, a preselected ROP, a preselected DWOB, and a preselected mud motor differential pressure.

For instance, a user such as a directional driller can select a desired target DTOB measurement value directly. A target DTOB measurement value also can be automatically computed, such as by drilling application software, for example. That is, user input can include a preselected DTOB measurement value.

Further, user input can include a preselected ROP. A desired ROP can be selected by a directional driller or other user, for example, and the target DTOB measurement value can be determined as a function of the desired ROP:

$$DTOB_{desired} = f(ROP_{desired})$$

subject to: 1) $WOB_{min} \leq WOB \leq WOB_{max}$

2) $DiffP_{min} \leq DiffP \leq DiffP_{max}$

3) $RPM_{min} \leq RPM \leq RPM_{max}$ 4) safety operational limits where RPM is drill bit torsional speed. The safety operational limits can include, but are not limited to, a hook-load limit, an annular pressure limit, and a vibration limit.

In addition, user input can include a preselected DWOB. The desired DWOB can be used to compute the desired DTOB as a function of the desired DWOB:

$$DTOB_{desired} = f(DWOB_{desired})$$

subject to: 1) $ROP_{min} \leq ROP \leq ROP_{max}$

2) $DiffP_{min} \leq DiffP \leq DiffP_{max}$

3) $RPM_{min} \leq RPM \leq RPM_{max}$ 4) safety operational limits

User input still further can include a preselected mud motor differential pressure. A desired mud motor differential pressure can be used to compute the desired DTOB as a function of the desired DiffP:

$$DTOB_{desired} = f(\Delta P_{desired})$$

subject to: 1) $ROP_{min} \leq ROP \leq ROP_{max}$
2) $DWOB_{min} \leq DWOB \leq DWOB_{max}$
3) $RPM_{min} \leq RPM \leq RPM_{max}$
4) safety operational limits The target DTOB measurement value also can be determined as a function of two or more of desired ROP, desired DWOB, desired DiffP, and desired drill bit RPM, subject to safety operational limits.

In addition to systems, embodiments of the invention can include methods to control directional drilling in borehole drilling for hydrocarbon wells. For example, a method according to an embodiment can include determining an actual DTOB measurement value (and/or an actual DWOB measurement value) and an actual toolface orientation measurement value for a drill string 104 positioned in a borehole 102 for a hydrocarbon well. A method also can include determining, responsive to a comparison of a target DTOB measurement value (and/or a target DWOB measurement value) and the actual DTOB measurement value (and/or the actual DWOB measurement value), a DTOB error value (and/or a DWOB error value). Further, a method can include determining, responsive to a comparison of a target toolface orientation measurement value and the actual toolface orientation measurement value, a toolface orientation error value. In addition, a method can include determining a control command for one or more of a top drive 114 and a drawworks 116 responsive to the DTOB error value (and/or the DWOB error value) and the toolface orientation error value. A method still further can include operating one or more of the top drive 114 and the drawworks 116 responsive to the control command thereby to correct a toolface orientation of the drill string 104.

In some circumstances, determining the actual DTOB measurement value can include determining an actual DWOB measurement value. Additionally, determining the actual DTOB measurement value (and/or the actual DWOB measurement value) and the actual toolface orientation measurement value can be responsive to one or more of: (a) one or more measurements at one or more sensors 120 positioned within the borehole 102 and (b) a Kalman filter. Further, a method also can include receiving the one or more measurements from the one or more sensors 102 through one or more segments of wired drill pipe 106 and determining a current top drive operation measurement value and a current drawworks operation measurement value. The control command can be responsive to the current top drive operation measurement value and the current drawworks operation measurement value. The control command can be for one or more of the top drive, the drawworks, and a mud pump, and the method also can include determining a current mud pump operation measurement value and operating the mud pump responsive to the control command thereby to correct a toolface orientation of the drill string 104. Determining the actual DTOB measurement value (and/or the actual DWOB measurement value) and the actual toolface measurement value can include validating the one or more measurements at the one or more sensors 120 thereby to produce one or more validated measurements and filtering the one or more validated measurements thereby to produce one or more filtered measurements. Additionally, determining the actual DTOB measurement value (and/or the actual DWOB measurement value) and the actual toolface measurement value can include reconciling the one or more filtered measurements thereby to produce one or more reconciled measurements and verifying the one or more reconciled measurements thereby to produce one or more verified measurements. Determining the actual DTOB measurement value (and/or the actual DWOB measurement value) and the actual toolface measurement value also can include remediating gross errors in the one or more verified measurements thereby to produce the actual DTOB measurement value (and/or the actual DWOB measurement value) and the actual toolface measurement value.

Additionally, operation of the drawworks 116 can include altering a WOB measurement value at a surface of the borehole, and operation of the top drive 114 can include altering one or more of an angle of the drill string 104 with respect to the surface and a rotational speed of the drill string 104 within the borehole 102. A method also can include determining the target DTOB measurement value (and/or the target DWOB measurement value) responsive to receipt of user input from a user computing device. The user input can include one or more of: a preselected DTOB measurement value, a preselected rate of penetration, a preselected DWOB, and a preselected mud motor differential pressure. A method also can include determining the target toolface orientation measurement value responsive to receipt of the user input from the user computing device.

Further, the control command can be responsive to one or more dynamic models of the drill string 104 within the borehole 102, and operation of the drawworks 116 can control a ROP of the drill string 102. A method also can include estimating one or more future values of one or more downhole variables and determining an optimal ROP of the drill string 104 responsive to a constrained optimization problem. Additionally, the control command can be responsive to the determined optimal ROP of the drill string 104.

Embodiments also can include non-transitory computer-readable media to control directional drilling in borehole drilling for hydrocarbon wells. For example, a non-transitory computer-readable medium according to an embodiment can have computer-executable instructions stored thereon that can be executed by one or more processors to perform a method, such as one or more of the methods described herein.

Figure 6:
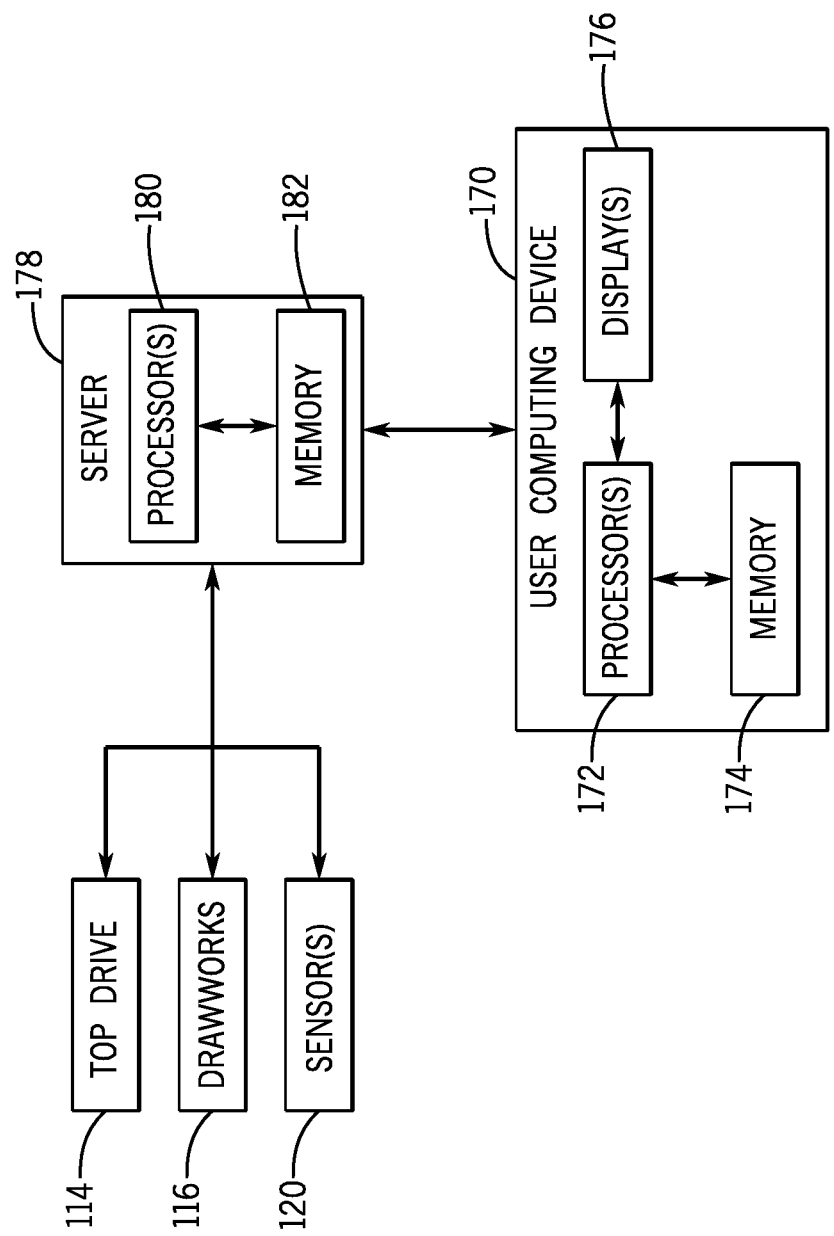
FIG. 6 is a schematic diagram of a system according to an embodiment of the invention.

Another method according to an embodiment to control directional drilling in borehole drilling for hydrocarbon wells can include providing a directional drilling monitor application to a user on a user computing device 170, as illustrated in FIG. 6, for example. Such a user computing device 170 can include, for example, a desktop computer, a laptop, a smartphone, a tablet computer, or a personal digital assistant, among other examples. Further, the user computing device 170 can be positioned and located at or near a drilling site, but the user computing device 170 also can be positioned at a remote location, such as an operator's office facility or remote operations center, for example, or at any other location. A user computing device 170 can include one or more processors 172, one or more memories 174 (such as non-transitory computer-readable media) in communication with the one or more processors 172, and one or more displays 176 in communication with the one or more processors 172, for example.

A method also can include receiving measurements at a server 178 from one or more sensors 120 positioned in a borehole 102 for a hydrocarbon well. The borehole 102 can extend from a surface into a subsurface of the hydrocarbon well. The server 178 can be positioned and located at the drilling site, but the server 178 also can be positioned at a remote location, similarly to the user computing device 170.

Further, the server 178 and the user computer device 170 can be positioned at the same location, either at the drilling site or at a remote site, or the server 178 and the user computer device 170 can be positioned at different locations from each other, including two separate remote locations. The server 178 can include one or more processors 180 and a memory 182 (such as a non-transitory computer-readable medium) that stores the user's preferences for information format and is in communication with the one or more processors 180. The server 178 can be in communication with the user computing device 170, a top drive 114, a drawworks 116, and the one or more sensors 120.

The one or more processors 180 of the server 178 can operate to perform a series of steps. For example, the one or more processors 180 can operate to determine, responsive to the received measurements, an actual DTOB measurement value and an actual toolface orientation measurement value for a drill string 104 positioned in the borehole 102. The one or more processors 180 also can operate to determine a target DTOB measurement value responsive to receipt of user input from the user computing device 170. Further, the one or more processors 180 can operate to determine a target toolface orientation measurement value responsive to receipt of the user input from the user computing device 170. The one or more processors 180 also can operate to determine, responsive to a comparison of the target DTOB measurement value and the actual DTOB measurement value, a DTOB error value. In addition, the one or more processors 180 can operate to determine, responsive to a comparison of the target toolface orientation measurement value and the actual toolface orientation measurement value, a toolface orientation error value. Still further, the one or more processors 180 can operate to determine a control command for one or more of a top drive 114 and a drawworks 116 to correct each of the DTOB error value and the toolface orientation error value responsive to a current top drive operation measurement value and a current drawworks operation measurement value. The one or more processors 180 also can operate to generate a directional drilling alert from the actual DTOB measurement value, the actual toolface orientation measurement value, and the control command. Further, the one or more processors 180 can operate to format the directional drilling alert according to the information format and transmit the formatted directional drilling alert to the user computing device 170 thereby to indicate a planned change in drill string orientation. In addition, the one or more processors 180 can operate one or more of the top drive 114 and the drawworks 116 responsive to the control command thereby to correct a toolface orientation of the drill string 104. Operation of the drawworks 116 can include altering a WOB measurement value at the surface, and operation of the top drive 114 can include altering one or more of an angle of the drill string 104 with respect to the surface and a rotational speed of the drill string 104 within the borehole 102.

Figure 2:
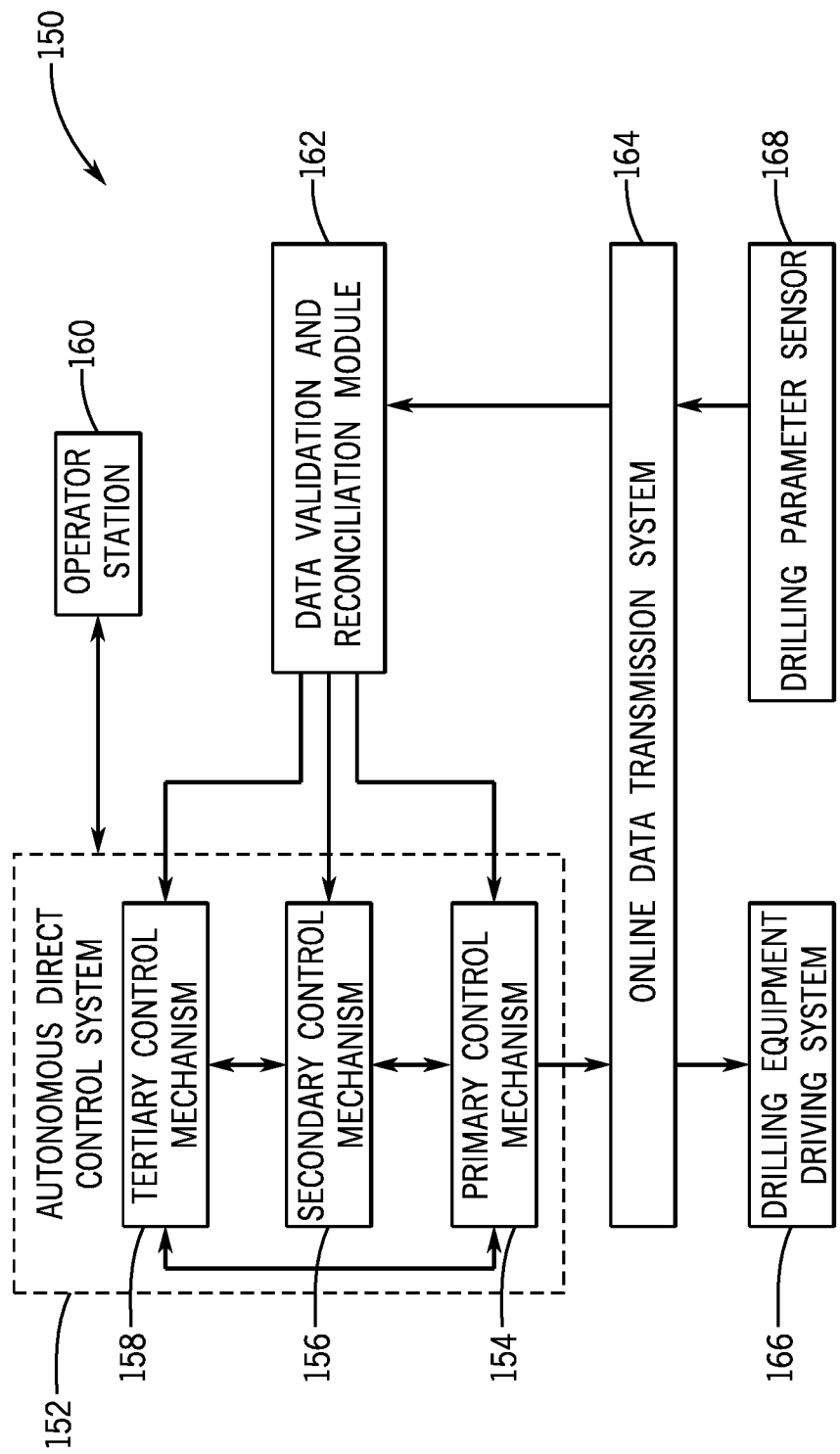
FIG. 2 is a schematic diagram of a system according to an embodiment of the invention.

In some instances, a system according to an embodiment can include one or more modules. A module can include a set of instructions or operations or one or more portions of a software application that relate to and operate to effect certain functions of the software, for example, as will be understood by those skilled in the art. Computer-executable instructions that make up a software application can be stored on a non-transitory computer-readable medium, for example, such as those described herein. For example, as depicted in the exemplary system diagram illustrated in FIG. 2, an autonomous direct controlled steering system 150 according to an embodiment can be configured to automate directional drilling operations where a drill string 104 is guided along a non-vertical path. In operation, the high sampling rate drilling parameter sensors 168 (which can include downhole sensors 120 and surface sensors 122, for example) and a downhole drive controller 112 can provide data to a data validation and reconciliation module 162 via the substantially online data transmission system 164 (such as data transmission system 124), which can make direct control possible. Such a data validation and reconciliation module 162 can process the raw data and provide the refined information to an autonomous direct control system 152, which can evaluate the real-time performance of the steering operation and accordingly provide online operating commands to one or more drilling equipment driving systems 166. The one or more drilling equipment driving systems 166 can include the top drive 114, the drawworks 116, the mud pump 118, as well as controllers associated with any of the equipment used during drilling. A drilling equipment driving system 166 can be a drive control interface or software of any drilling equipment or apparatus that can either directly or indirectly affect one or more drilling parameters. Further, such equipment can be mounted in downhole or at the surface. Exemplary rig-mounted equipment includes, but is not limited to, rotating system equipment (such as one or more top drives 114), hoisting system equipment (such as one or more drawworks 116), and circulating system equipment (such as one or more mud pumps 118). Exemplary downhole equipment can include any downhole active or adjustable devices such as mud motors, turbines, bent subs or whipstocks, adjustable stabilizers, agitators, and rotary steerable systems.

Some or all of the data validation and reconciliation operations described above, including some or all of those illustrated in FIG. 3, can be performed by a data validation and reconciliation module 162, for example. In such an example, FIG. 3 can depict an exemplary workflow of the data validation and reconciliation module 162.

Further, the autonomous direct control system 152 can perform some of the other operations described above. The autonomous direct control system 152 can be in bidirectional communication with a common operation infrastructure, including an operator station 160. The operator station 160 can provide a user interface that can be accessed by a directional driller on the rig or in a remote location, for example. The operator station 160 also can provide a location for providing manual input to the control system 152 and for manual override of the control system 152 if needed. The control station 160 can provide a visual representation of the operation of the autonomous direct control system 152, including the status of one or more drilling equipment 166 and a real-time representation of data received from the drilling parameter sensors 168. The BHA 108 can be coupled to and in communication with a rotating system (such as a top drive 114), a hoisting system (such as a drawworks 116), or other surface equipment via a drill pipe 106. Under an autonomous direct control operation, the raw data collected by the high sampling rate drilling parameter sensors 168 can be relayed to the data validation and reconciliation module 162 via the online data transmission system 164. The drilling parameter sensors 168 also can be configured to receive operating instructions (in addition to sending measurements) via the online transmission system 164. The raw data collected by the drilling parameter sensors 168 can be processed online by the data validation and reconciliation module 162 to obtain refined information useful for decision-making by the autonomous direct control system 152.

An autonomous direct control system 152 can include one or more components referred to herein as mechanisms, such as a primary control mechanism 154, a secondary control mechanism 156, and a tertiary control mechanism 158. A mechanism as described can include a set of instructions or operations or a portion of a software application that relates to and operates to effect certain functions of the software, for example, as will be understood by those skilled in the art. Computer-executable instructions that make up a software application can be stored on a non-transitory computer-readable medium, for example, such as those described herein. In some instances, the autonomous direct control system 152 depicted in FIG. 2 can include only a primary control mechanism 154 that provides online operating commands to one or more drilling equipment driving systems 166 in order to ensure stability and robustness of automated directional drilling against a wide range of external disturbances, measurement uncertainties, and unknown environmental conditions. Such a primary control mechanism 154 can be fully implemented either in a downhole device or in a surface application. In either case, the communication between the surface and the downhole can be enabled by an online data transmission system 164.

Some or all of the operations described above, including some or all of those illustrated in FIG. 4, can be performed by such a primary control mechanism 154, for example. In such an example, FIG. 4 can depict a simplified block diagram and an exemplary workflow of the primary control mechanism 154. More specifically, FIG. 4 can illustrate an exemplary workflow of the primary control mechanism 154 utilizing control logic related to a disturbance rejection method. Such disturbance rejection control logic can receive a scaled deviation error of toolface orientation 254 and one or more of scaled deviation errors of DTOB and DWOB 252, along with drill string torsional compliance data, and accordingly can issue operating commands 262 via an output interface to one or more drilling equipment and apparatuses, including rotating system equipment such as top drives, hoisting system equipment such as drawworks, circulating system equipment such as mud pumps, and downhole RSS equipment. The control logic can be a multivariable (also called multi-input multi-output) control method with a model-independent core logic 262. In some instances, such active disturbance rejection control logic can include one or more proportional-integral-derivative (PID) controllers, where the input to each PID controller can be a function of the scaled deviation errors and drill string torsional compliance data. Further, in some circumstances, the control logic can be associated with a fuzzy logic controller. An extension of a system model with an additional and fictitious state variable that represents everything that a user does not include in a mathematical description of the plant of interest can be used, as well. A plant, as will be understood by those skilled in the art, can include a system on which the disturbance control logic can operate, including drilling equipment (such as sensors, a drawworks, a top drive, and a mud pump, for example) and information transmitted to and from the drilling equipment. This virtual state (sum of internal and external disturbances, sometimes denoted as a "total disturbance") can be estimated online with a state observer and used in the control signal in order to decouple unknown uncertainties from the rest of the drilling system. This disturbance rejection feature can allow the user to treat the considered system with a simpler model, since the negative effects of modeling uncertainty can be compensated in real time. As a result, it can eliminate a need for a precise analytical description of the system, as one can assume the unknown parts of dynamics as the internal disturbance in the drilling system. Robustness and the adaptive ability of this method can provide an advantageous solution in scenarios where the full knowledge of the drilling system is not available.

Figure 10:
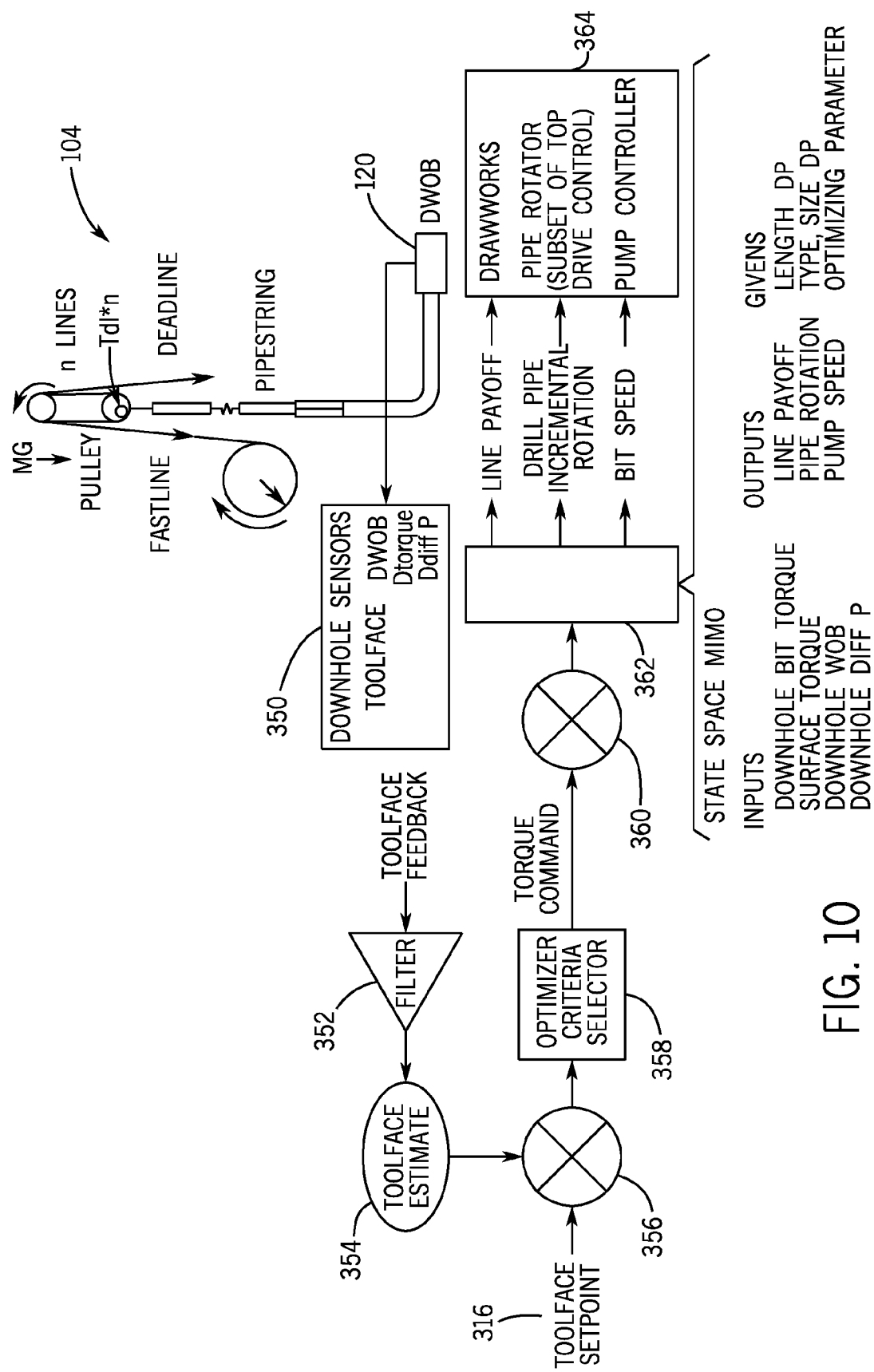
FIG. 10 is a schematic diagram of a method according to an embodiment of the invention.

An additional method according to an embodiment is illustrated in FIG. 10, for example. Measurements can be taken 350 from one or more downhole sensors 120 positioned along a drill string 104, including measurements related to toolface orientation, downhole WOB (DWOB), downhole torque (Dtorque), and downhole differential pressure (Ddiff P). These measurements can be used to determine toolface orientation, which can be filtered 352 to generate a toolface estimate 354. The toolface estimate 354 and a target toolface 316 can be summed 356, then optimization criteria can be selected 358. A torque command can be processed 360 and used as an input to a state space MIMO 362. The state space MIMO 362 can include inputs of downhole bit torque, surface torque, downhole WOB, and downhole differential pressure. The state space MIMO 362 further can utilize as given inputs the length of the drill pipe, the type and size of the drill pipe, and one or more optimizing parameters. Outputs of the state space MIMO 362 can include line payoff, pipe rotation, and pump speed. Line payoff, drill pipe incremental rotation, and bit speed then can be sent to one or more controllers 364, which can control operation of a drawworks, a pipe rotator (which can be a subset of a top drive control), and a pump controller.

Figure 11:
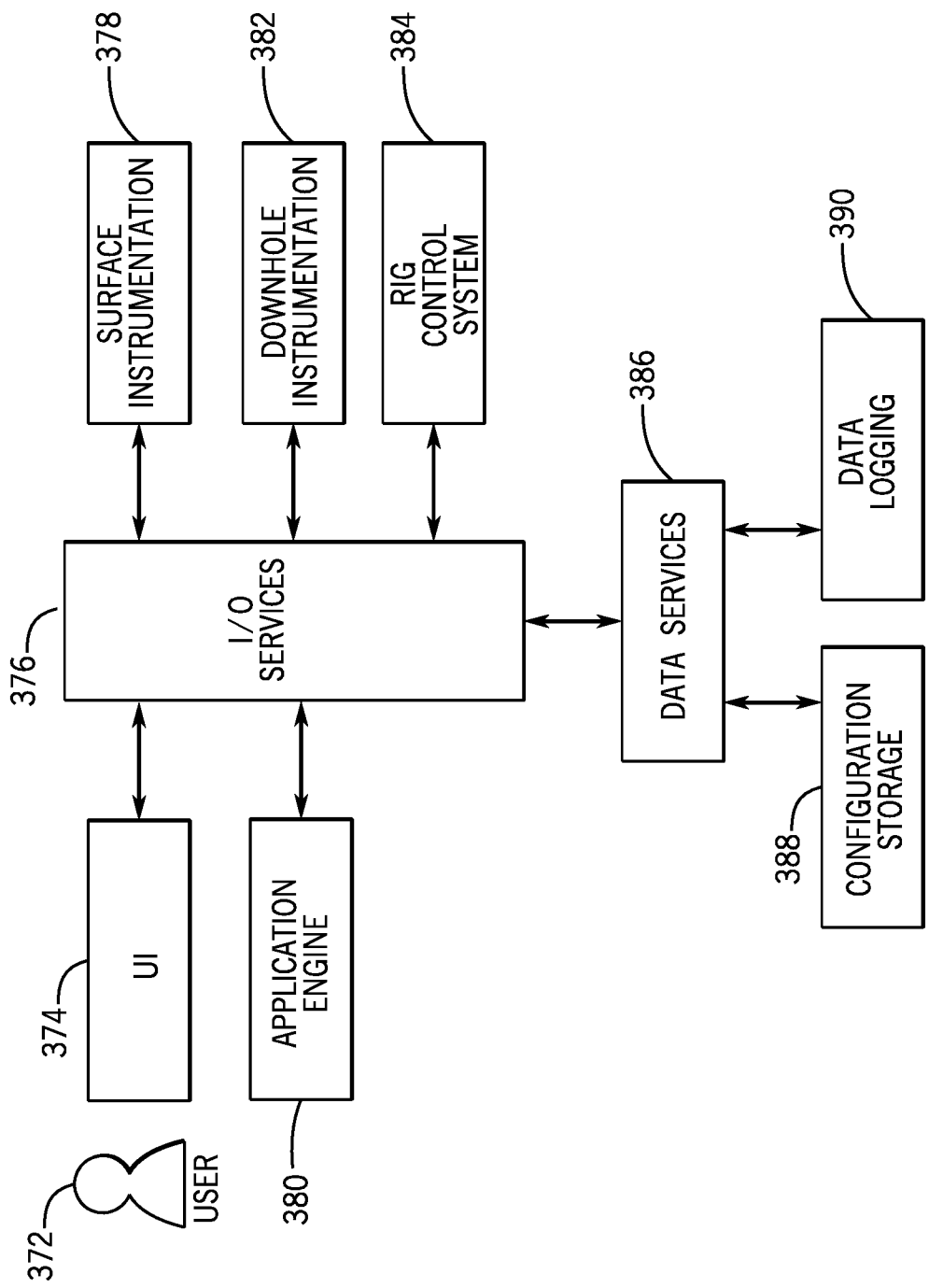
FIG. 11 is a schematic diagram of a system according to an embodiment of the invention.

Further, an additional system according to an embodiment is illustrated in FIG. 11, for example. Such a system can allow input from one or more users 372 through a user interface 374. The user interface 374 can be in communication, through input/output services 376, with surface instrumentation 378, downhole instrumentation 382, a rig control system 384, data services 386, and an application engine 380. The application engine 380 can perform one or more of the operations or methods described herein. Further, the data services 386 can be in communication with configuration storage 388 and data logging 390.

Embodiments of the invention thus can provide autonomous direct controlled steering in directional drilling that can include: a drilling parameter sensor with high sampling rate; a data validation and reconciliation module that can be communicatively coupled to the drilling parameter sensor through an online data transmission system and can generate processed data from the raw data gathered by the drilling parameter sensor; a primary control mechanism that can enhance stability and robustness of automated directional drilling by online commanding a drilling equipment driving system; a secondary control mechanism that adaptively can guide the primary control mechanism based on a drill string dynamic model; and a tertiary control mechanism that can determine an optimal rate of penetration by online solving a constrained optimization problem.

Consequently, embodiments of the invention can provide drilling optimization software to automate and optimize directional drilling practices to set and continuously maintain downhole equipment orientation while also optimizing drilling rate of penetration. Such a software application can achieve this automation by applying downhole measurements of torque, WOB, and differential pressure to continuously control surface pipe rotary and drawworks systems. Further, such a software application also can enable automated directional drilling to be performed and monitored from a remote operations center.

In the various embodiments of the invention described herein, a person having ordinary skill in the art will recognize that various types of memory are readable by a computer, such as the memory described herein in reference to the various computers and servers, e.g., computer, computer server, web server, or other computers with embodiments of the present invention. Examples of computer-readable media can include but are not limited to: nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described above and can operate on a computer. It will be understood by those skilled in the art that such media can be at other locations instead of, or in addition to, the locations described to store computer program products, e.g., including software thereon. It will be understood by those skilled in the art that the various software modules or electronic components described above can be implemented and maintained by electronic hardware, software, or a combination of the two, and that such embodiments are contemplated by embodiments of the present invention.

This application is a U.S. National Phase under 35 U.S.C. § 371 of International Application No. PCT/US2015/067865, filed Dec. 29, 2015, titled "SYSTEMS AND METHODS TO CONTROL DIRECTIONAL DRILLING FOR HYDROCARBON WELLS" which is a continuation-in-part of U.S. patent application Ser. No. 14/627,581, filed Feb. 20, 2015, titled "DRILLING DIRECT CONTROL USER INTERFACE," which claims priority to U.S. Patent Provisional Application No. 62/097,644, filed Dec. 30, 2014, titled "DRILLING DIRECT CONTROL SYSTEM," all of which are incorporated by reference herein in their entirety.

In the drawings and specification, there have been disclosed embodiments of systems, interfaces, computer-readable media, and methods of the present invention, and although specific terms are employed, the terms are used in a descriptive sense only and not for purposes of limitation. The embodiments of systems, interfaces, computer-readable media, and methods of the present invention have been described in considerable detail with specific reference to these illustrated embodiments. It will be apparent, however, that various modifications and changes can be made within the spirit and scope of the embodiments of systems, interfaces, computer-readable media, and methods of the present invention as described in the foregoing specification, and such modifications and changes are to be considered equivalents and part of this disclosure.

That claimed is:

1. A system to control directional drilling in borehole drilling for hydrocarbon wells, the system comprising:
a controller including one or more processors;
a non-transitory computer-readable medium in communication with the one or more processors of the controller and having one or more computer programs stored thereon that, when executed by the one or more processors, cause the system to:
determine an actual downhole torque on bit (DTOB) measurement value and an actual toolface orientation measurement value for a drill string positioned in a borehole for a hydrocarbon well,
determine, responsive to a comparison of a target DTOB measurement value and the actual DTOB measurement value, a DTOB error value,
determine, responsive to a comparison of a target toolface orientation measurement value and the actual toolface orientation measurement value, a toolface orientation error value,
determine a control command, to correct a toolface orientation of the drill string, for one or more of a top drive and a drawworks responsive to the DTOB error value and the toolface orientation error value, and
operate one or more of the top drive and the drawworks responsive to the control command thereby to correct the toolface orientation of the drill string;
wherein operation of the drawworks includes altering a weight on bit (WOB) measurement value at a surface of the borehole, wherein operation of the top drive includes altering one or more of an angle of the drill string with respect to the surface and a rotational speed of the drill string within the borehole, and wherein the one or more computer programs, when executed by the one or more processors, further cause the system to:
determine the target DTOB measurement value responsive to receipt of user input from a user computing device in communication with the controller, the user input including one or more of: a preselected DTOB measurement value, a preselected rate of penetration, a preselected downhole WOB, and a preselected mud motor differential pressure; and
determine the target toolface orientation measurement value responsive to receipt of the user input from the user computing device.

2. A system of claim 1, wherein determining the actual DTOB measurement value includes determining an actual downhole weight on bit (DWOB) measurement value, and wherein determining the actual DTOB measurement value and the actual toolface orientation measurement value is responsive to one or more of: (a) a Kalman filter and (b) one or more measurements at one or more sensors positioned within the borehole.

3. A system of claim 1, wherein the controller is in communication with one or more sensors positioned within the borehole through one or more segments of wired drill pipe; wherein the one or more computer programs, when executed by the one or more processors, further cause the system to determine a current top drive operation measurement value and a current drawworks operation measurement value; and wherein the control command is responsive to the current top drive operation measurement value and the current drawworks operation measurement value.

4. A system of claim 3, wherein the control command is for one or more of the top drive, the drawworks, and a mud pump; and wherein the one or more computer programs, when executed by the one or more processors, further cause the system to determine a current mud pump operation measurement value and to operate the mud pump responsive to the control command thereby to correct a toolface orientation of the drill string.

5. A system of claim 2, wherein determining the actual DTOB measurement value and the actual toolface measurement value includes:
validating the one or more measurements at the one or more sensors thereby to produce one or more validated measurements;
filtering the one or more validated measurements thereby to produce one or more filtered measurements;

reconciling the one or more filtered measurements thereby to produce one or more reconciled measurements;

verifying the one or more reconciled measurements thereby to produce one or more verified measurements; and remediating errors in the one or more verified measurements thereby to produce the actual DTOB measurement value and the actual toolface measurement value.

6. A system of claim 1, wherein the control command is responsive to one or more dynamic models of the drill string within the borehole; wherein operation of the drawworks controls a rate of penetration of the drill string; wherein the one or more computer programs, when executed by the one or more processors, cause the system to estimate one or more future values of one or more downhole variables and to determine an optimal rate of penetration of the drill string responsive to a constrained optimization problem; and wherein the control command is responsive to the determined optimal rate of penetration of the drill string.

7. A method to control directional drilling in borehole drilling for hydrocarbon wells, the method comprising:

determining an actual downhole torque on bit (DTOB) measurement value and an actual toolface orientation measurement value for a drill string positioned in a borehole for a hydrocarbon well, determining, responsive to a comparison of a target DTOB measurement value and the actual DTOB measurement value, a DTOB error value, determining, responsive to a comparison of a target toolface orientation measurement value and the actual toolface orientation measurement value, a toolface orientation error value, determining a control command, to correct a toolface orientation of the drill string, for one or more of a top drive and a drawworks responsive to the DTOB error value and the toolface orientation error value, and operating one or more of the top drive and the drawworks responsive to the control command thereby to correct the toolface orientation of the drill string;

wherein operation of the drawworks includes altering a weight on bit (WOB) measurement value at a surface of the borehole, wherein operation of the top drive includes altering one or more of an angle of the drill string with respect to the surface and a rotational speed of the drill string within the borehole, and wherein the method further comprises:

determining the target DTOB measurement value responsive to receipt of user input from a user computing device, the user input including one or more of: a preselected DTOB measurement value, a preselected rate of penetration, a preselected downhole WOB, and a preselected mud motor differential pressure; and determining the target toolface orientation measurement value responsive to receipt of the user input from the user computing device.

8. A method of claim 7, wherein determining the actual DTOB measurement value includes determining an actual downhole weight on bit (DWOB) measurement value, and wherein determining the actual DTOB measurement value and the actual toolface orientation measurement value is responsive to one or more of: (a) a Kalman filter and (b) one or more measurements at one or more sensors positioned within the borehole.

9. A method of claim 7, wherein the method further comprises receiving the one or more measurements from one or more sensors positioned within the borehole through one or more segments of wired drill pipe and determining a current top drive operation measurement value and a current drawworks operation measurement value, and wherein the control command is responsive to the current top drive operation measurement value and the current drawworks operation measurement value.

10. A method of claim 9, wherein the control command is for one or more of the top drive, the drawworks, and a mud pump; and wherein the method further comprises determining a current mud pump operation measurement value and operating the mud pump responsive to the control command thereby to correct a toolface orientation of the drill string.

11. A method of claim 8, wherein determining the actual DTOB measurement value and the actual toolface measurement value includes:

validating the one or more measurements at the one or more sensors thereby to produce one or more validated measurements;

filtering the one or more validated measurements thereby to produce one or more filtered measurements;

reconciling the one or more filtered measurements thereby to produce one or more reconciled measurements;

verifying the one or more reconciled measurements thereby to produce one or more verified measurements; and remediating errors in the one or more verified measurements thereby to produce the actual DTOB measurement value and the actual toolface measurement value.

12. A method of claim 7, wherein the control command is responsive to one or more dynamic models of the drill string within the borehole; wherein operation of the drawworks controls a rate of penetration of the drill string; wherein the method further comprises estimating one or more future values of one or more downhole variables and determining an optimal rate of penetration of the drill string responsive to a constrained optimization problem; and wherein the control command is responsive to the determined optimal rate of penetration of the drill string.

* * * * *